United States Patent
Amidon et al.

(10) Patent No.: US 9,445,158 B2
(45) Date of Patent: Sep. 13, 2016

(54) DISTRIBUTED AGGREGATED CONTENT GUIDE FOR COLLABORATIVE PLAYBACK SESSION

(75) Inventors: Christopher M. Amidon, Apex, NC (US); Kunal Kandekar, Jersey City, NJ (US); Scott Curtis, Durham, NC (US)

(73) Assignee: ELOY TECHNOLOGY, LLC, Wilmington, DE (US)

(*) Notice: Subject to any disclaimer, the term of this patent is extended or adjusted under 35 U.S.C. 154(b) by 1261 days.

(21) Appl. No.: 12/914,115

(22) Filed: Oct. 28, 2010

(65) Prior Publication Data

US 2012/0117488 A1    May 10, 2012

Related U.S. Application Data

(60) Provisional application No. 61/258,946, filed on Nov. 6, 2009.

(51) Int. Cl.
*G06F 3/00* (2006.01)
*H04N 21/4788* (2011.01)
*H04N 21/45* (2011.01)
*H04N 21/454* (2011.01)
*H04N 21/462* (2011.01)
*H04N 5/445* (2011.01)

(52) U.S. Cl.
CPC ........ *H04N 21/4788* (2013.01); *H04N 21/454* (2013.01); *H04N 21/4532* (2013.01); *H04N 21/4622* (2013.01); *H04N 2005/44547* (2013.01)

(58) Field of Classification Search
CPC .................................................. H04N 21/4532
USPC ....................................................... 715/753
See application file for complete search history.

(56) References Cited

U.S. PATENT DOCUMENTS

| 4,468,732 | A | 8/1984 | Raver |
| 4,694,490 | A | 9/1987 | Harvey et al. |
| 4,704,725 | A | 11/1987 | Harvey et al. |
| 4,827,447 | A | 5/1989 | Croes et al. |
| 4,956,774 | A | 9/1990 | Shibamiya et al. |

(Continued)

FOREIGN PATENT DOCUMENTS

WO    WO 97/17793    5/1997

OTHER PUBLICATIONS

Maes, P., "Agents that Reduce Work and Information Overload," Communications of the Association for Computer Machinery, vol. 37, No. 7, Jul. 1994, pp. 31-40 and 146, 11 pages.

(Continued)

*Primary Examiner* — William Titcomb

(57) ABSTRACT

A system and method are disclosed for enabling a distributed group of users to collaboratively select a media item for a collaborative playback session. In one embodiment, a distributed group of users for a collaborative playback session is formed, where the distributed group of users includes a number of users located at a number of geographically distributed user sites. Each user site includes one or more media controllers having access to media content and one or more renderers that operate to render the media content. A distributed aggregate guide that includes a listing of media content accessible to the media controllers at all of the user sites is generated and utilized by users at the user sites to suggest media items for the collaborative playback session. Based on the suggestions of the users, a media item for the collaborative playback session is selected.

30 Claims, 11 Drawing Sheets

(56) References Cited

U.S. PATENT DOCUMENTS

| | | | |
|---|---|---|---|
| 4,965,825 A | 10/1990 | Harvey et al. | |
| 5,109,414 A | 4/1992 | Harvey et al. | |
| 5,115,501 A | 5/1992 | Kerr | |
| 5,121,478 A | 6/1992 | Rao | |
| 5,223,924 A | 6/1993 | Strubbe | |
| 5,233,654 A | 8/1993 | Harvey et al. | |
| 5,335,277 A | 8/1994 | Harvey et al. | |
| 5,347,632 A | 9/1994 | Filepp et al. | |
| 5,353,121 A | 10/1994 | Young et al. | |
| 5,367,686 A | 11/1994 | Fisher et al. | |
| 5,404,510 A | 4/1995 | Smith et al. | |
| 5,412,808 A | 5/1995 | Bauer | |
| 5,446,891 A | 8/1995 | Kaplan et al. | |
| 5,526,034 A | 6/1996 | Hoarty et al. | |
| 5,528,304 A | 6/1996 | Cherrick et al. | |
| 5,530,852 A | 6/1996 | Meske, Jr. et al. | |
| 5,550,576 A | 8/1996 | Klosterman | |
| 5,579,055 A | 11/1996 | Hamilton et al. | |
| 5,585,865 A | 12/1996 | Amano et al. | |
| 5,587,734 A | 12/1996 | Lauder et al. | |
| 5,592,660 A | 1/1997 | Yokota et al. | |
| 5,594,507 A | 1/1997 | Hoarty | |
| 5,594,509 A | 1/1997 | Florin et al. | |
| 5,596,373 A | 1/1997 | White et al. | |
| 5,598,536 A | 1/1997 | Slaughter, III et al. | |
| 5,600,378 A | 2/1997 | Wasilewski | |
| 5,630,119 A | 5/1997 | Aristides et al. | |
| 5,652,613 A | 7/1997 | Lazarus et al. | |
| 5,666,645 A | 9/1997 | Thomas et al. | |
| 5,694,176 A | 12/1997 | Bruette et al. | |
| 5,695,400 A | 12/1997 | Fennell, Jr. et al. | |
| 5,696,897 A | 12/1997 | Dong | |
| 5,701,451 A | 12/1997 | Rogers et al. | |
| 5,710,884 A | 1/1998 | Dedrick | |
| 5,712,129 A | 1/1998 | Ford | |
| 5,712,979 A | 1/1998 | Graber et al. | |
| 5,717,860 A | 2/1998 | Graber et al. | |
| 5,719,786 A | 2/1998 | Nelson et al. | |
| 5,727,129 A | 3/1998 | Barrett et al. | |
| 5,737,599 A | 4/1998 | Rowe et al. | |
| 5,754,938 A | 5/1998 | Herz et al. | |
| 5,754,939 A | 5/1998 | Herz et al. | |
| 5,758,257 A | 5/1998 | Herz et al. | |
| 5,761,662 A | 6/1998 | Dasan | |
| 5,774,664 A | 6/1998 | Hidary et al. | |
| 5,778,187 A | 7/1998 | Monteiro et al. | |
| 5,784,058 A | 7/1998 | LaStrange et al. | |
| 5,784,608 A | 7/1998 | Meske, Jr. et al. | |
| 5,793,438 A | 8/1998 | Bedard | |
| 5,801,747 A | 9/1998 | Bedard | |
| 5,801,753 A | 9/1998 | Eyer et al. | |
| 5,812,123 A | 9/1998 | Rowe et al. | |
| 5,813,007 A | 9/1998 | Nielsen | |
| 5,819,301 A | 10/1998 | Rowe et al. | |
| 5,854,897 A | 12/1998 | Radziewicz et al. | |
| 5,867,495 A | 2/1999 | Elliott et al. | |
| 5,887,243 A | 3/1999 | Harvey et al. | |
| 5,893,091 A | 4/1999 | Hunt et al. | |
| 5,907,843 A | 5/1999 | Cleron et al. | |
| 5,923,362 A | 7/1999 | Klosterman | |
| 5,945,988 A | 8/1999 | Williams et al. | |
| 5,948,040 A | 9/1999 | DeLorme et al. | |
| 5,977,964 A | 11/1999 | Williams et al. | |
| 5,986,656 A | 11/1999 | Crutcher et al. | |
| 5,990,890 A | 11/1999 | Etheredge | |
| 6,005,563 A | 12/1999 | White et al. | |
| 6,034,683 A | 3/2000 | Mansour et al. | |
| 6,072,486 A | 6/2000 | Sheldon et al. | |
| 6,119,098 A | 9/2000 | Guyot et al. | |
| 6,141,058 A | 10/2000 | Lagoni et al. | |
| 6,317,881 B1 | 11/2001 | Shah-Nazaroff et al. | |
| 6,349,297 B1 | 2/2002 | Shaw et al. | |
| 6,351,467 B1 | 2/2002 | Dillon | |
| 6,388,714 B1 | 5/2002 | Schein et al. | |
| 6,434,621 B1 | 8/2002 | Pezzillo et al. | |
| 6,442,598 B1 | 8/2002 | Wright et al. | |
| 6,459,427 B1 | 10/2002 | Mao et al. | |
| 6,476,827 B1 | 11/2002 | Porter | |
| 6,486,892 B1 | 11/2002 | Stern | |
| 6,614,890 B2 | 9/2003 | Perlman et al. | |
| 6,647,389 B1 | 11/2003 | Fitch et al. | |
| 6,735,701 B1 | 5/2004 | Jacobson | |
| 6,760,916 B2 | 7/2004 | Holtz et al. | |
| 6,772,433 B1 | 8/2004 | LaJoie et al. | |
| 6,823,344 B1 | 11/2004 | Isensee et al. | |
| 6,986,154 B1 | 1/2006 | Price et al. | |
| 7,096,486 B1 | 8/2006 | Ukai et al. | |
| 7,149,511 B1 | 12/2006 | Bachner, III et al. | |
| 7,185,355 B1 | 2/2007 | Ellis et al. | |
| 7,197,713 B2 | 3/2007 | Stern | |
| 7,373,650 B1 | 5/2008 | Rodriguez et al. | |
| 7,395,514 B2 | 7/2008 | Stern | |
| 7,454,777 B1 | 11/2008 | Nishikawa et al. | |
| 7,571,452 B2 | 8/2009 | Gutta | |
| 7,634,466 B2 | 12/2009 | Rose et al. | |
| 7,689,510 B2 | 3/2010 | Lamkin et al. | |
| 7,779,097 B2 | 8/2010 | Lamkin et al. | |
| 7,818,350 B2 * | 10/2010 | New et al. | 707/803 |
| 7,849,486 B2 | 12/2010 | Russ et al. | |
| 7,895,625 B1 | 2/2011 | Bryan et al. | |
| 7,987,490 B2 | 7/2011 | Ansari et al. | |
| 8,046,697 B2 | 10/2011 | Stern | |
| 8,060,525 B2 * | 11/2011 | Svendsen et al. | 707/769 |
| 8,112,720 B2 * | 2/2012 | Curtis | 715/811 |
| 2001/0023401 A1 | 9/2001 | Weishut et al. | |
| 2002/0038387 A1 | 3/2002 | Fuiks et al. | |
| 2002/0053078 A1 | 5/2002 | Holtz et al. | |
| 2002/0053081 A1 | 5/2002 | Griggs | |
| 2002/0174428 A1 | 11/2002 | Agnihotri et al. | |
| 2002/0175931 A1 | 11/2002 | Holtz et al. | |
| 2002/0186233 A1 | 12/2002 | Holtz et al. | |
| 2003/0038840 A1 | 2/2003 | Stern | |
| 2003/0048299 A1 | 3/2003 | Stern | |
| 2003/0048808 A1 | 3/2003 | Stahl et al. | |
| 2003/0051246 A1 | 3/2003 | Wilder et al. | |
| 2003/0052916 A1 | 3/2003 | Stern | |
| 2003/0084452 A1 | 5/2003 | Ryan et al. | |
| 2003/0088410 A1 | 5/2003 | Geidl et al. | |
| 2003/0093793 A1 | 5/2003 | Gutta | |
| 2003/0184598 A1 | 10/2003 | Graham | |
| 2003/0200336 A1 | 10/2003 | Pal et al. | |
| 2003/0237093 A1 | 12/2003 | Marsh | |
| 2004/0003393 A1 | 1/2004 | Gutta et al. | |
| 2004/0003400 A1 | 1/2004 | Carney et al. | |
| 2004/0025180 A1 | 2/2004 | Begeja et al. | |
| 2004/0049787 A1 | 3/2004 | Maissel et al. | |
| 2004/0060061 A1 | 3/2004 | Parker | |
| 2004/0068739 A1 | 4/2004 | Russ et al. | |
| 2004/0078807 A1 | 4/2004 | Fries et al. | |
| 2004/0078814 A1 | 4/2004 | Allen | |
| 2004/0098754 A1 * | 5/2004 | Vella et al. | 725/135 |
| 2004/0131336 A1 | 7/2004 | Matsuno et al. | |
| 2004/0221308 A1 | 11/2004 | Cuttner et al. | |
| 2004/0268403 A1 | 12/2004 | Krieger et al. | |
| 2005/0022241 A1 | 1/2005 | Griggs | |
| 2005/0138658 A1 | 6/2005 | Bryan | |
| 2005/0149987 A1 | 7/2005 | Boccon-Gibod et al. | |
| 2005/0155052 A1 | 7/2005 | Ostrowska et al. | |
| 2005/0183110 A1 | 8/2005 | Anderson | |
| 2005/0187895 A1 | 8/2005 | Paya et al. | |
| 2005/0193015 A1 | 9/2005 | Logston et al. | |
| 2005/0251822 A1 | 11/2005 | Knowles et al. | |
| 2005/0251827 A1 | 11/2005 | Ellis et al. | |
| 2006/0020973 A1 | 1/2006 | Hannum et al. | |
| 2006/0031203 A1 | 2/2006 | Rosenbaum et al. | |
| 2006/0035610 A1 | 2/2006 | Potrebic | |
| 2006/0117354 A1 | 6/2006 | Schutte et al. | |
| 2006/0143068 A1 * | 6/2006 | Calabria | 705/10 |
| 2006/0150214 A1 | 7/2006 | Ramraz et al. | |
| 2006/0159109 A1 | 7/2006 | Lamkin et al. | |
| 2006/0161635 A1 | 7/2006 | Lamkin et al. | |
| 2006/0161953 A1 | 7/2006 | Walter et al. | |
| 2006/0168126 A1 | 7/2006 | Costa-Requena et al. | |
| 2006/0212906 A1 | 9/2006 | Cantalini | |

(56) References Cited

U.S. PATENT DOCUMENTS

| | | |
|---|---|---|
| 2006/0218581 A1 | 9/2006 | Ostrowska et al. |
| 2006/0253417 A1 | 11/2006 | Brownrigg et al. |
| 2006/0259926 A1 | 11/2006 | Scheelke et al. |
| 2006/0271997 A1* | 11/2006 | Jacoby et al. ............. 725/135 |
| 2006/0282851 A1 | 12/2006 | Errico et al. |
| 2006/0282852 A1 | 12/2006 | Purpura et al. |
| 2007/0011702 A1 | 1/2007 | Vaysman |
| 2007/0058924 A1 | 3/2007 | Yeh |
| 2007/0101368 A1 | 5/2007 | Jacoby et al. |
| 2007/0112935 A1 | 5/2007 | Espelien |
| 2007/0143128 A1 | 6/2007 | Tokarev et al. |
| 2007/0143260 A1 | 6/2007 | Markov et al. |
| 2007/0157237 A1 | 7/2007 | Cordray et al. |
| 2007/0169148 A1 | 7/2007 | Oddo et al. |
| 2007/0250896 A1 | 10/2007 | Parker et al. |
| 2007/0288960 A1 | 12/2007 | Akiyama |
| 2007/0294249 A1 | 12/2007 | Feyaerts |
| 2008/0034043 A1 | 2/2008 | Gandhi et al. |
| 2008/0034276 A1* | 2/2008 | Ficco ............. 715/201 |
| 2008/0086746 A1 | 4/2008 | King |
| 2008/0092056 A1 | 4/2008 | Walter et al. |
| 2008/0134043 A1 | 6/2008 | Georgis et al. |
| 2008/0134053 A1 | 6/2008 | Fischer |
| 2008/0163059 A1 | 7/2008 | Craner |
| 2008/0168495 A1 | 7/2008 | Roberts et al. |
| 2008/0195239 A1* | 8/2008 | Rotholtz et al. ............. 700/94 |
| 2008/0276279 A1 | 11/2008 | Gossweiler et al. |
| 2009/0015657 A1 | 1/2009 | Wong |
| 2009/0024910 A1 | 1/2009 | Kamat et al. |
| 2009/0055868 A1 | 2/2009 | Wehmeyer et al. |
| 2009/0150806 A1 | 6/2009 | Evje et al. |
| 2009/0158337 A1 | 6/2009 | Stiers et al. |
| 2009/0165046 A1 | 6/2009 | Stallings et al. |
| 2009/0165053 A1 | 6/2009 | Thyagarajan et al. |
| 2009/0254557 A1 | 10/2009 | Jordan |
| 2009/0293088 A1 | 11/2009 | Mukerji et al. |
| 2009/0310030 A1 | 12/2009 | Litwin et al. |
| 2010/0037274 A1 | 2/2010 | Meuninck et al. |
| 2010/0070995 A1 | 3/2010 | Pan |
| 2010/0077435 A1 | 3/2010 | Kandekar et al. |
| 2010/0094934 A1* | 4/2010 | Svendsen et al. ............. 709/204 |
| 2010/0114857 A1 | 5/2010 | Edwards et al. |
| 2010/0115554 A1 | 5/2010 | Drouet et al. |
| 2010/0131977 A1 | 5/2010 | San Jule et al. |
| 2010/0162172 A1 | 6/2010 | Aroner |
| 2010/0162321 A1 | 6/2010 | Bradley |
| 2010/0186029 A1 | 7/2010 | Kim et al. |
| 2010/0186034 A1 | 7/2010 | Walker |
| 2010/0199312 A1 | 8/2010 | Chang et al. |
| 2011/0125989 A1* | 5/2011 | Amidon et al. ............. 713/1 |
| 2011/0191318 A1 | 8/2011 | Gilbey et al. |
| 2012/0072851 A1 | 3/2012 | Stern |
| 2012/0117471 A1 | 5/2012 | Amidon et al. |
| 2012/0117581 A1 | 5/2012 | Curtis et al. |
| 2012/0117595 A1 | 5/2012 | Svendsen et al. |
| 2012/0117598 A1 | 5/2012 | Pons et al. |

OTHER PUBLICATIONS

Selker, T., "Coach: A Teaching Agent that Learns," Communications of the Association for Computer Machinery, vol. 37, No. 7, pp. 92-99, Jul. 1994, 8 pages.

Jameson, A. et al., "Enhancing Mutual Awareness in Group Recommender Systems," in B. Mobasher & S.S. Anand (Eds.), Proceedings of the Int. Joint Conference on Artificial Intelligence 2003 Workshop on Intelligent Techniques for Web Personalization, Aug. 9-15, 2003, Acapulco, Mexico, 8 pages.

Ali-Hasan, Noor F., "Exploring Social Media Scenarios for the Television," Proceedings of the International Conference on Weblogs and Social Media 2008 (ICWSM 2008), Mar. 30-Apr. 2, 2008, Seattle, Washington, copyright 2008, Association for the Advancement of Artificial Intelligence (AAAI) Press, Menlo Park, California, 8 pages.

"GeoCities and RealNetworks Team Up to Enable More Than 3 Million Homesteaders To Become Internet Broadcasters," PRNewswire, Company Press Release, RealNetworks, Inc., Mar. 1, 1999, copyright 1999, PRNewswire, printed Mar. 1, 1999, 4 pages.

"i-Watch DV-CUBE," brochure and technical specification, date unknown but obtained on or prior to May 19, 2009, 2 pages.

"Microsoft and Wink Communications Collaborate to Speed Adoption of Interactive Television Based on the ATVEF Specification," Microsoft TV Solutions News, Jun. 3, 1999, at <http://www.microsoft.com/tv/news/ne_wink_01.asp>, copyright 1998-1999, Microsoft Corporation, printed Jun. 15, 1999, 2 pages.

"Microsoft Announces Television Software Platform: Microsoft TV Platform Adaptation Kit (TVPAK)," PressPass, Jun. 14, 1999, at <http://www.microsoft.com/PressPass/press/1999/Jun99/TVPAKpr.htm>, copyright 1999, Microsoft Corporation, printed Jun. 15, 1999, 10 pages.

"Microsoft's TV Platform Makes Broadband Services a Reality for Cable Industry," PressPass, Jun. 14, 1999, at <http://www.microsoft.com/PressPass/features/1999/06-14ncta.htm>, copyright 1999, Microsoft Corporation, printed Jun. 15, 1999, 4 pages.

"Streaming Media—iParty Conference Call Available at A/V Newswire," Business Wire, Mar. 1, 1999, copyright 1999, Business Wire, printed Mar. 1, 1999, 1 page.

Abstract, "The Art of Human-Computer Interface Design," eds. Brenda Laurel and S. Joy Mountford, copyright 1990, Addison-Wesley Longman Publishing Col, Inc., Boston, Massachusetts, at <http://dl.acm.org/citation.cfm?id=575201>, from the ACM Digital Library, printed Jun. 26, 2012, 2 pages.

Davis, Jim, "The Miracle Box," CNET News.com, Nov. 17, 1998, copyright 1995-1998, CNET, Inc., printed Nov. 20, 1998, 4 pages.

McNeill, Alison, "TrustedOpinion.com Offers Netflix Subscribers More Relevant Movie Recommendations," at <http://www.prlog.org/10029611-trustedopinion-com-offers-netflix-subscribers-more-releva . . .>, Sep. 5, 2007, Palo Alto, California, printed May 15, 2009, 2 pages.

* cited by examiner

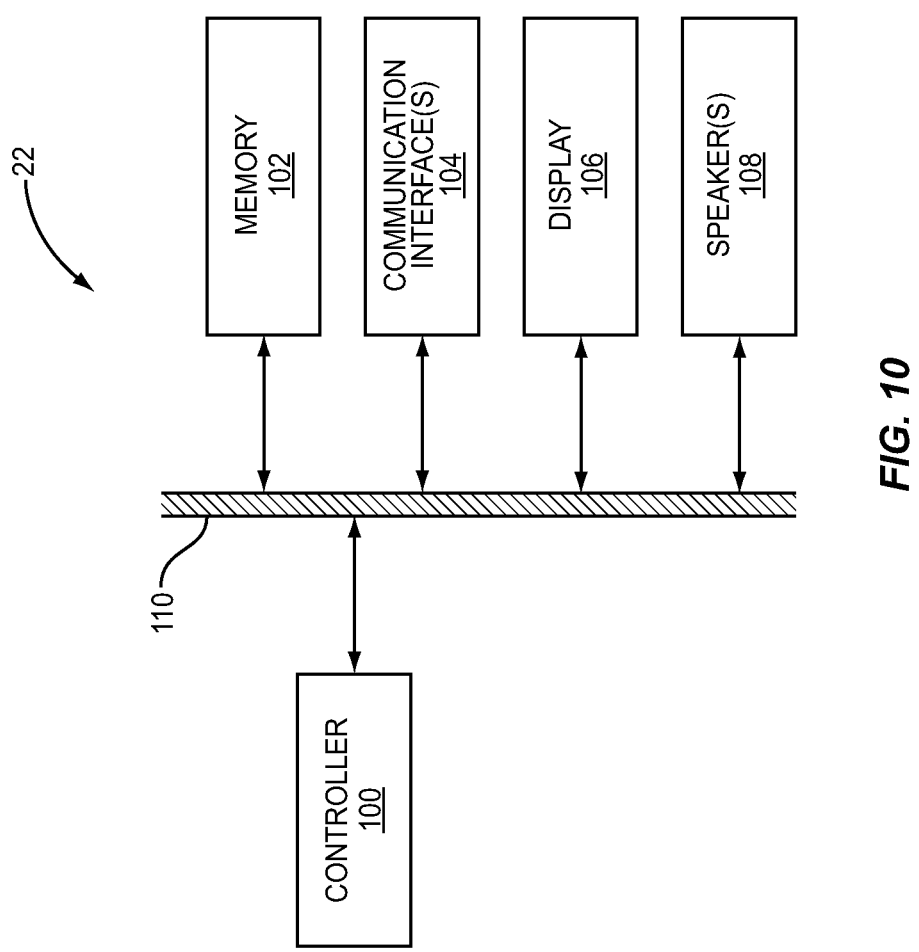

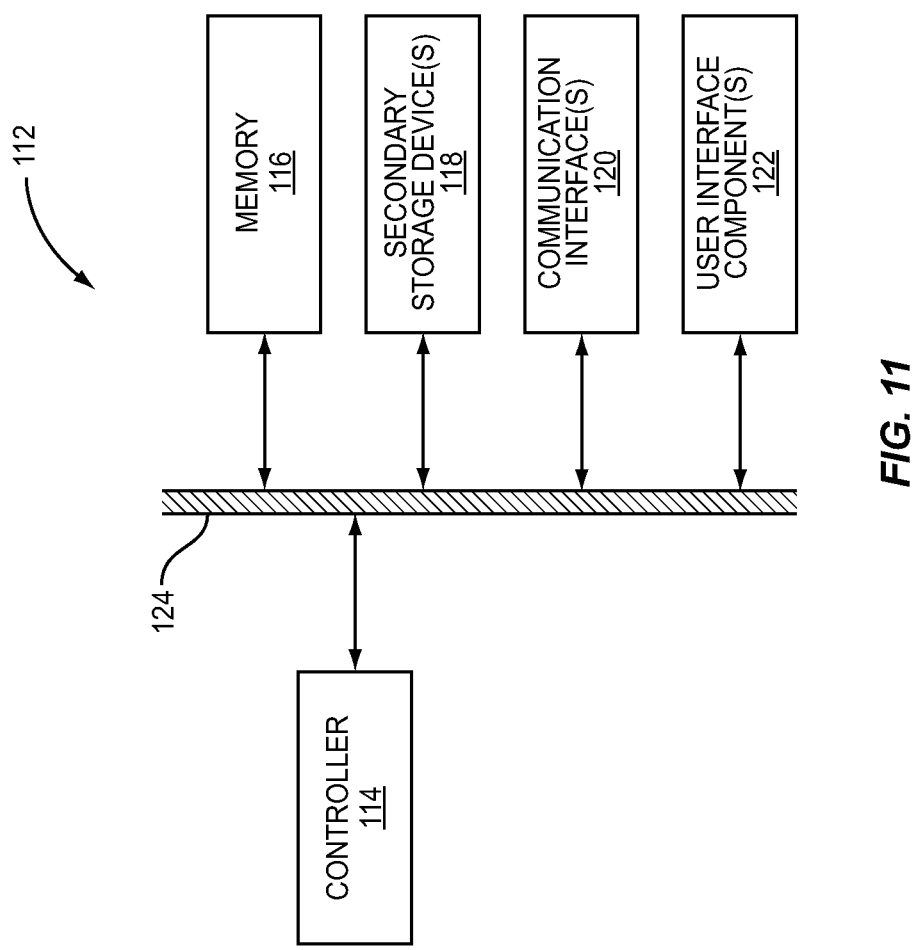

DISTRIBUTED AGGREGATED CONTENT GUIDE FOR COLLABORATIVE PLAYBACK SESSION

RELATED APPLICATIONS

This application claims the benefit of provisional patent application Ser. No. 61/258,946, filed Nov. 6, 2009, the disclosure of which is hereby incorporated herein by reference in its entirety.

FIELD OF THE DISCLOSURE

The present disclosure relates to a collaborative playback session for a group of users at different physical locations and more specifically relates to a system and method for selecting a media item for a collaborative playback session for a group of users at different physical locations.

BACKGROUND

Social networking services and related features are becoming increasingly popular. What is desired is a system and method that enables users at different locations to participate in a collaborative playback session and that enables these users to collaboratively select or influence the media item selected for the collaborative playback session.

SUMMARY

A system and method are disclosed for enabling a distributed group of users to collaboratively select a media item for a collaborative playback session. In one embodiment, a distributed group of users for a collaborative playback session is formed, where the distributed group of users includes a number of users located at a number of geographically distributed user sites. Each user site includes one or more media controllers having access to media content and one or more renderers that operate to render the media content. In the preferred embodiment, the media content is video content such as, for example, broadcast television content, video on demand content from a television service provider, video on demand content from an Internet source, locally stored video content, or the like. A distributed aggregate guide that includes a listing of media content accessible to the media controllers at all of the user sites is generated and utilized by users at the user sites to suggest media items for the collaborative playback session. Based on the suggestions of the users, a media item for the collaborative playback session is selected. Playback of the selected media item is then effected at the user sites to thereby provide the collaborative playback session.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 10 is a block diagram of one of the renderers of FIG. 1 according to one embodiment of the present disclosure; and FIG. 11 is a block diagram of a device hosting one of the media brokers of FIG. 1 according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
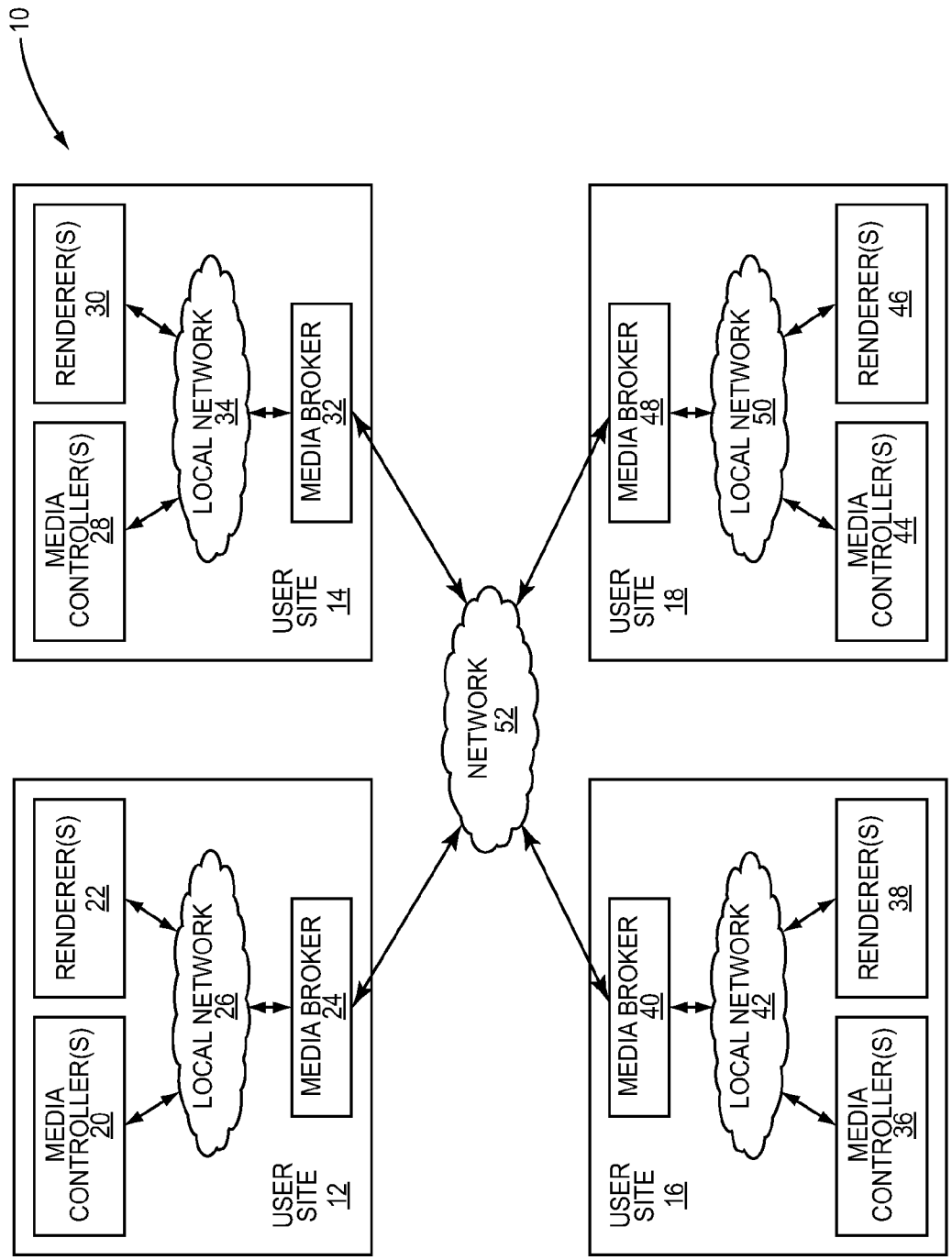
FIG. 1 illustrates a system for providing a collaborative playback session according to one embodiment of the present disclosure.

FIG. 1 illustrates a system 10 for providing a collaborative playback session for a distributed group of users located at a number of geographically distributed user sites 12 through 18 according to one embodiment of the present disclosure. Note that the system 10 may include any number of two or more user sites, such as the user sites 12 through 18. Further, while FIG. 1 illustrates only the user sites 12 through 18 at which users in the distributed group of users for the collaborative playback session are located, the system 10 may include additional user sites. As used herein, a "user site" is a physical site at which users are enabled to consume media content (e.g., view video content). Although not limited to these examples, exemplary "user sites" are user residences (e.g., homes or apartments), buildings, or the like.

The user site 12 includes one or more media controllers 20, one or more renderers 22, and a media broker 24 connected via a local network 26. The local network 26 is preferably a wired or wireless Local Area Network (LAN) such as, for example, a WiFi or IEEE 802.11x network. Preferably, the user site 12 is a person's home, where the media controllers 20 and renderers 22 are located in the person's home. For example, the media controllers 20 and the renderers 22 may include a media controller 20 and a renderer 22 in a first room of the home, a renderer 22 located in a second room of the home, a media controller 20 located in a third room of the home, and a media controller 20 and a renderer 22 located in a fourth room of the home.

The media controllers 20 are generally devices that operate as sources of media content at the user site 12. For this discussion, the media content sourced by the media controllers 20 is video content. However, the present disclosure is not limited thereto. The media content sourced by the media controllers 20 may be, for example, movies, television programs, video clips, home movies, or the like. The media content sourced by the media controllers 20 may be stored locally at the media controllers 20 or may be obtained from remote sources. More specifically, the media content sourced by the media controllers 20 may be locally stored video content such as, for example, television content (i.e., television programs or movies) broadcast by a television service provider and recorded by the media controllers 20 (e.g., television content recorded on a Digital Video Recorder (DVR)), television content purchased and downloaded to the media controllers 20 from an Internet-based service (e.g., television programs downloaded from the iTunes® store), movies purchased and downloaded to the media controllers 20 from an Internet-based service (e.g., movies downloaded from the iTunes® store), or the like. In addition or alternatively, the media content sourced by the media controllers 20 may be video on demand content such as, for example, movies or television programs that are provided on-demand from a television service provider, streaming video content from an Internet-based streaming video service (e.g., Hulu, Netflix®, CBS.com, or the like), or the like.

In one specific embodiment, the media controllers 20 are devices that operate as Digital Living Network Alliance (DLNA) digital media servers. However, the present disclosure is not limited thereto. Exemplary types of media controllers 20 are set-top boxes that have access to live and/or on-demand television content from terrestrial or satellite television networks; personal computers that have access to stored video content and/or Internet-based streaming video content; DVRs that have access to stored video content such as, for example, stored television content; Apple TV® devices; gaming consoles (e.g., PlayStation 3®) that have access to Internet-based video content (e.g., Netflix streaming video service, Hulu, or CBS.com); network storage devices (e.g., a Network Attached Storage (NAS) device); or the like.

The renderers 22 are generally devices that operate to provide playback or rendering of video content from the media controllers 20. In one embodiment, video content may be streamed from any media controller 20 at the user site 12 to any renderer 22 at the user site 12 via the local network 26. The video content may be streamed directly from the media controller 20 to the renderer 22 or streamed through the media broker 24. In one specific embodiment, the renderers 22 are devices that operate as DLNA digital media players or digital media renderers. However, the present disclosure is not limited thereto. Exemplary types of renderers 22 are televisions, gaming consoles, set-top boxes, personal computers, or the like. Note that while the media controllers 20 and the renderers 22 are illustrated separately for clarity and ease of discussion, it should be appreciated that a single device may operate as both a media controller 20 and a renderer 22 and in some cases a media broker 24. For example, a personal computer may operates both as a media controller 20 that operates as a source of video content for the renderers 22 and as a renderer 22 that provides playback or rendering of video content from the media controllers 20.

The media broker 24 is preferably implemented in software and is hosted either by a separate device at the user site 12 or one of the existing devices at the user site 12. For example, the media broker 24 may be hosted by a separate computer at the user site 12. Alternatively, one of the media controllers 20 may be a personal computer, and the media broker 24 may be hosted by that personal computer. As discussed below, in one embodiment, the media broker 24 operates to maintain a local aggregate guide that includes a listing of all of the media content accessible to the media controllers 20 and therefore available for playback or rendering at the renderers 22.

Just as the user site 12 includes the media controllers 20, the renderers 22, and the media broker 24 communicatively coupled by the local network 26, the user site 14 includes one or more media controllers 28, one or more renderers 30, and a media broker 32 connected via a local network 34. The details of the media controllers 28, the renderers 30, the media broker 32, and the local network 34 are the same as that provided above for the corresponding components at the user site 12. As such, the details are not repeated. Likewise, the user site 16 includes one or more media controllers 36, one or more renderers 38, and a media broker 40 connected via a local network 42. Again, the details of the media controllers 36, the renderers 38, the media broker 40, and the local network 42 are the same as that provided above for the corresponding components at the user site 12. As such, the details are not repeated. Further, the user site 18 includes one or more media controllers 44, one or more renderers 46, and a media broker 48 connected via a local network 50. Again, the details of the media controllers 44, the renderers 46, the media broker 48, and the local network 50 are the same as that provided above for the corresponding components at the user site 12. As such, the details are not repeated.

Lastly, the media brokers 24, 32, 40, and 48 at the user sites 12 through 18, respectively, are communicatively coupled via a network 52. Preferably, the network 52 is a distributed public network such as, for example, the Internet. As discussed below in detail, in one embodiment, the media brokers 24, 32, 40, and 48 exchange their local aggregate guides, or filtered versions thereof, with one another. Each of the media brokers 24, 32, 40, and 48 then aggregates the local aggregate guides for the user sites 12 through 18 to form a distributed aggregate guide for the user sites 12 through 18. In another embodiment, one of the media brokers 24, 32, 40, and 48 operates as a master media broker. Using the media broker 24 as an example, the media broker 24, when operating as the master media broker, obtains the local aggregate guides for the user sites 14 through 18 (or filtered versions thereof) and aggregates the local aggregate guides for the user sites 14 through 18 with the local aggregate guide for the user site 12 to form the distributed aggregate guide. In either embodiment, users at the user sites 12 through 18 are then enabled to select media items to suggest for a collaborative playback session from the distributed aggregate guide. Based on the suggestions from the users, a media item is selected for the collaborative playback session. The media brokers 24, 32, 40, and 48 then cause playback of the selected media item at the user sites 12 through 18 to provide the collaborative playback session.

Figure 2:
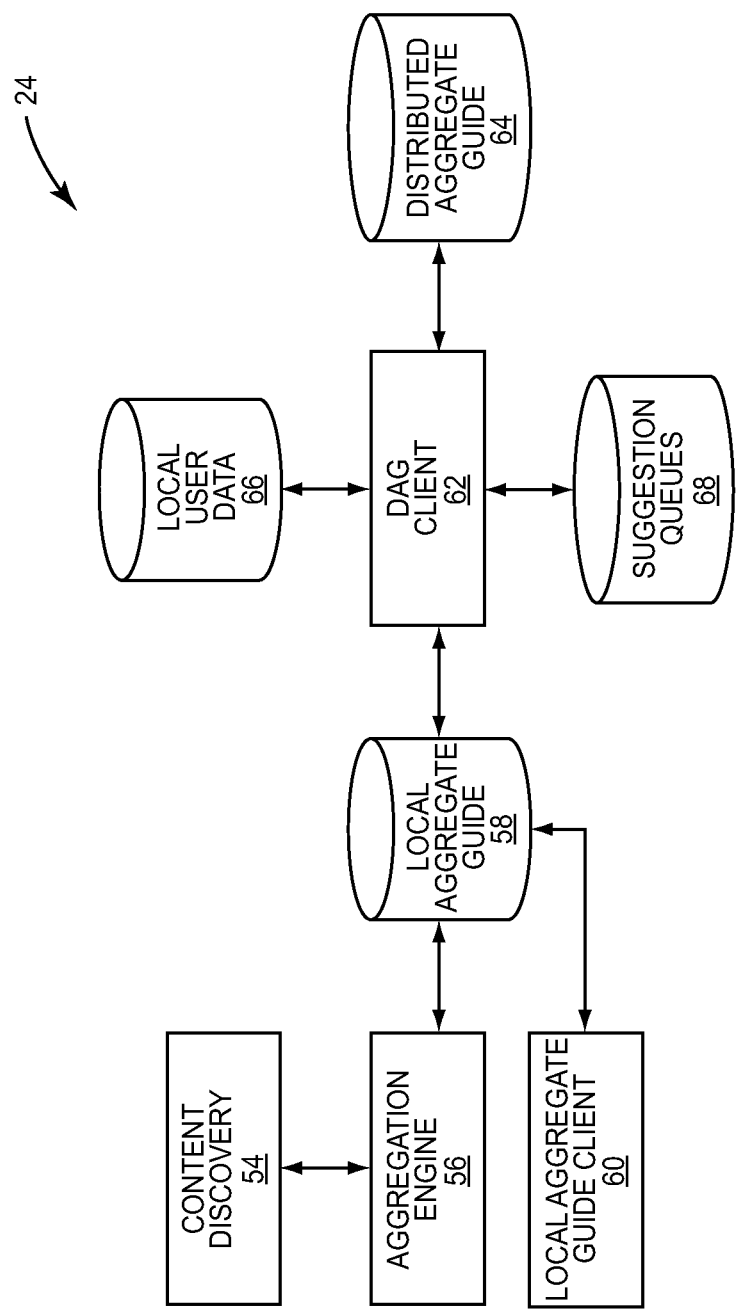
FIG. 2 is a functional block diagram of one of the media brokers at one of the distributed user sites of FIG. 1 according to one embodiment of the present disclosure.

FIG. 2 is a functional block diagram of the media broker 24 of FIG. 1 according to one embodiment of the present disclosure. This discussion is equally applicable to the other media brokers 32, 40, and 48. As illustrated, the media broker 24 includes a content discovery function 54, an aggregation engine 56, a local aggregate guide 58, a local aggregate guide client 60, a distributed aggregate guide (DAG) client 62, a distributed aggregate guide 64, local user data 66, and a number of suggestion queues 68. The content discovery function 54 discovers media content accessible to the media controllers 20 at the user site 12. While any suitable discovery technique may be used, in one embodiment, the content discovery function 54 queries the media controllers 20 for lists of media content accessible to the media controllers 20. These lists may be referred to herein as local guides of the media controllers 20. Updates may be obtained from the media controllers 20 as needed (e.g., periodically). In another embodiment, the media controllers 20 proactively send their local guides and corresponding updates to the content discovery function 54.

The aggregation engine 56 operates to aggregate, or merge, the local guides of the media controllers 20 to form the local aggregate guide 58 for the user site 12. The local aggregate guide 58 may be implemented as, for example, a list of media items and, for each media item, a list of media controllers 20 from which the media item is accessible. In addition, for time restricted media items such as live broadcast television content, the local aggregate guide 58 may include timing information that identifies times at which those media items are accessible to the media controllers 20 (e.g., times at which the media items will be broadcast). The local aggregate guide client 60 generally operates to serve local aggregate guide and media content requests from the renderers 22, as described below in detail.

The DAG client 62 generally operates to obtain the distributed aggregate guide 64, which is an aggregate of the local aggregate guide 58 of the user site 12 (or a filtered version thereof) and local aggregate guides of the other user sites 14 through 18 (or filtered versions thereof). The local user data 66 includes user preferences of the user(s) of the user site 12 where the user preferences may be used to filter the local aggregate guide 58 prior to aggregation with the local aggregate guides of the other user sites 14 through 18 to form the distributed aggregate guide 64. In addition or alternatively, the user preferences may include user preferences that are used to personalize the distributed aggregate guide 64 when displayed to the users of the user site 12. The suggestion queues 68 include a suggestion queue for each user to participate in a collaborative playback session (i.e., each user in a distributed group of users for a collaborative playback session). As discussed below, the suggestion queue of a user includes a list of media items selected by the corresponding user from the distributed aggregate guide 64 as media items to suggest for the collaborative playback session.

Figure 3:
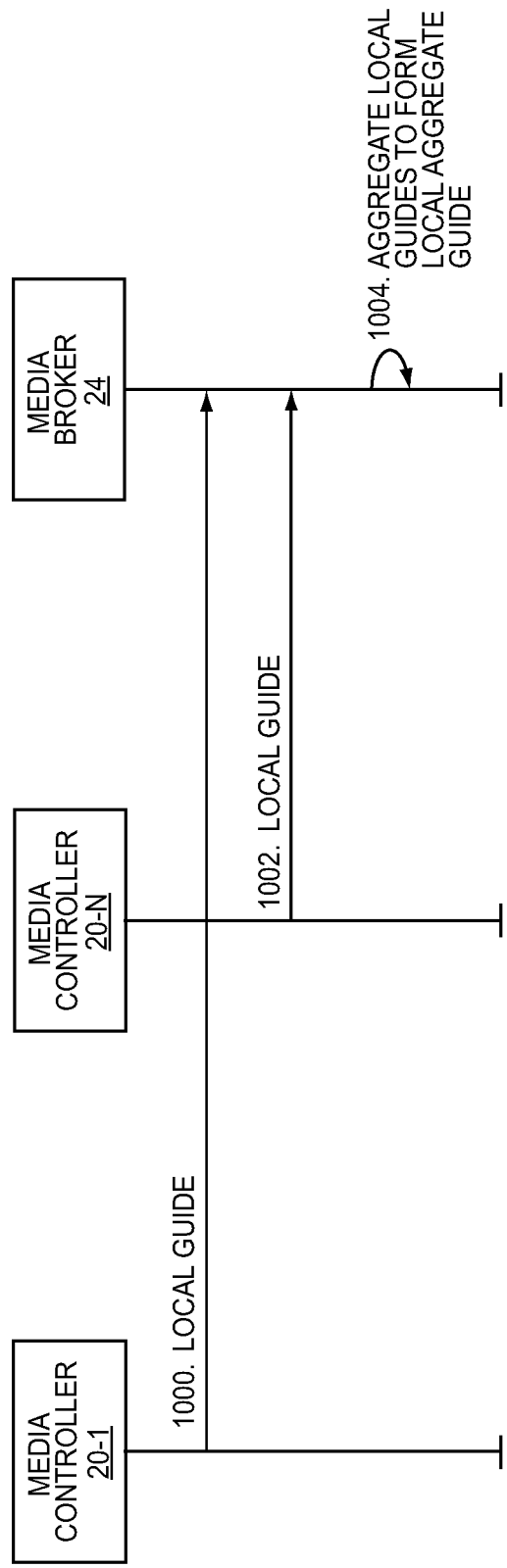
FIG. 3 illustrates the operation of one of the media brokers of FIG. 1 to generate a local aggregate guide for the corresponding user site according to one embodiment of the present disclosure.

FIG. 3 illustrates the operation of the media broker 24, and specifically the aggregation engine 56 of the media broker 24, to generate the local aggregate guide 58 of the user site 12 according to one embodiment of the present disclosure. This discussion is equally applicable to the other media brokers 32, 40, and 48. As illustrated, the media broker 24 obtains the local guides of the media controllers 20 at the user site 12, which are individually shown as media controllers 20-1 through 20-N (steps 1000 through 1002). In this embodiment, the media controllers 20-1 through 20-N proactively provide their local guides to the media broker 24. Alternatively, the media broker 24 may query the media controllers 20-1 through 20-N for their local guides. The aggregation engine 56 of the media broker 24 then aggregates the local guides of the media controllers 20-1 through 20-N to form the local aggregate guide 58 (step 1004). At this point, the updates to the local guides of the media controllers 20-1 through 20-N are preferably obtained as needed or desired (e.g., periodically every hour or every night at 1 am). Alternatively, any updates in the local guides of the media controllers 20-1 through 20-N are pushed to the media broker 24 as they occur. In response to receiving updates, the local aggregate guide 58 is updated accordingly.

Figure 4:
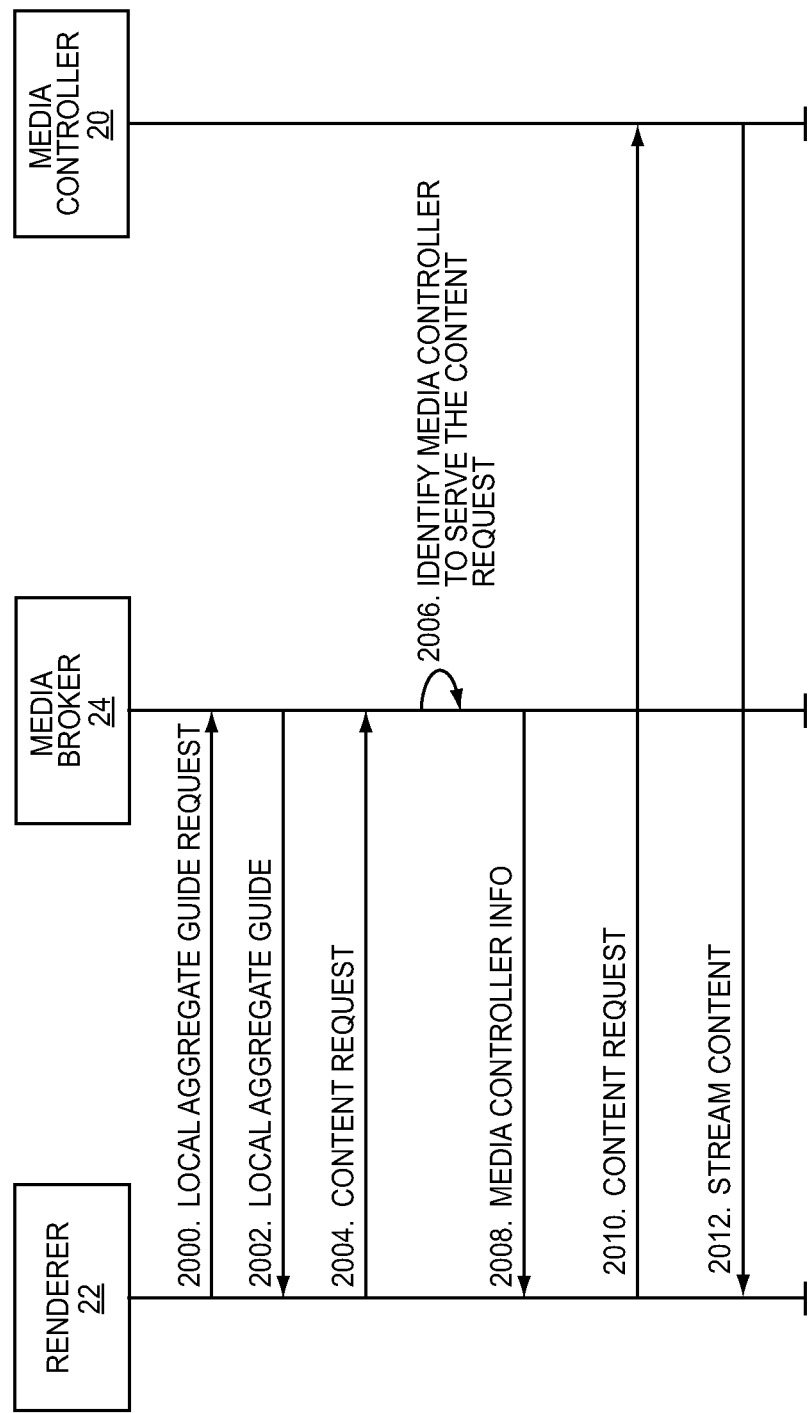
FIG. 4 illustrates the operation of one of the media brokers to enable display or playback of video content on one of the renderers at one of the user sites from one of the media controllers at the same user site according to one embodiment of the present disclosure.

FIG. 4 illustrates the operation of the media broker 24, and more specifically the local aggregate guide client 60 of the media broker 24, to serve merged guide and media content requests at the user site 12 according to one embodiment of the present disclosure. This discussion is equally applicable to the other media brokers 32, 40, and 48 at the user sites 14 through 18. First, one of the renderers 22 sends a local aggregate guide request to the media broker 24 via the local network 26 (step 2000). In response, the media broker 24 returns the local aggregate guide 58, or some relevant portion thereof, to the renderer 22 (step 2002). For example, the media broker 24 may obtain an aggregate, or merged, list of media items currently accessible to the media controllers 20 from the local aggregate guide 58 and return this aggregate list of media items to the renderer 22 rather than the entire local aggregate guide 58. While not illustrated, the renderer 22 displays the local aggregate guide 58 to an associated user, and the associated user is enabled to select a desired media item for rendering at the renderer 22. In response to receiving the selection from the associated user, the renderer 22 sends a content request for the desired media item to the media broker 24 (step 2004).

The media broker 24 then identifies one of the media controllers 20 that can serve the content request (step 2006). Specifically, the media controller 20 identified to serve the content request is one of the media controllers 20 enabled to source the desired media item at the time of the content request. The media broker 24 then returns a response to the renderer 22 that includes media controller information for the media controller 20 identified for serving the content request (step 2008). The media controller information includes information that enables the renderer 22 to request the desired media item from the media controller 20 such as, for example, an Internet Protocol (IP) address of the media controller 20 and any credentials needed to access the media controller 20 (e.g., a password). Next, the renderer 22 sends a content request for the desired media item to the media controller 20 via the local network 26 (step 2010). In response, the media controller 20 streams the desired media item to the renderer 22 (step 2012).

In an alternative embodiment, the local aggregate guide 58, or a portion thereof, returned to the renderer 22 in step 2002 may include information identifying the media controllers 20 from which the media items are accessible. Then, once the desired media item is selected at the renderer 22, the renderer 22 may use the information in the local aggregate guide 58 to identify the media controller 20 from which the desired media item is accessible and then send a request for the desired media item to that media controller 20. In this manner, the renderer 22 is not required to contact the media broker 24 to determine which media controller 20 is able to source the desired media item.

Figure 5:
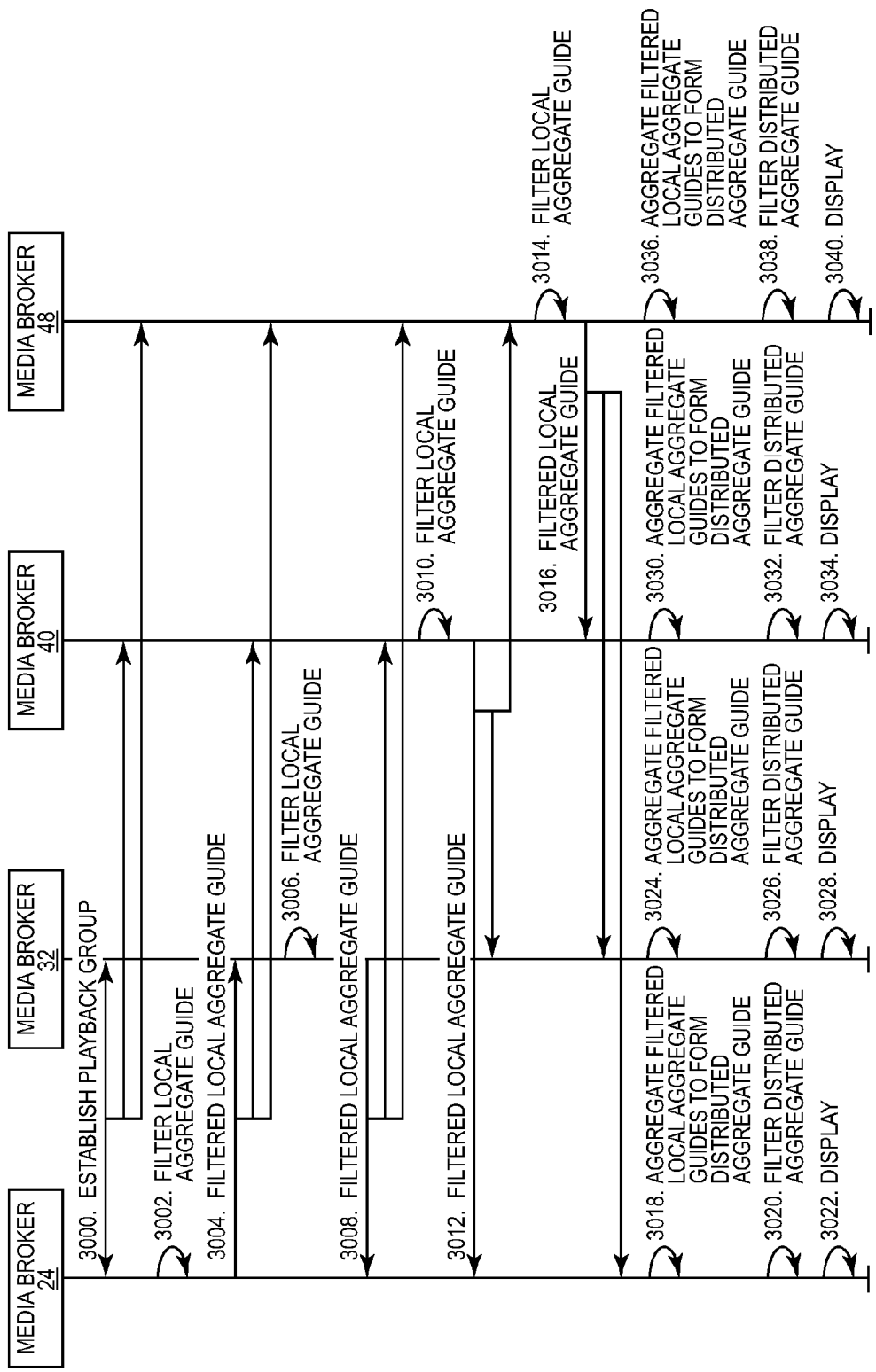
FIG. 5 illustrates the operation of the system of FIG. 1 to generate a distributed aggregate guide for a distributed group of users according to one embodiment of the present disclosure.

FIG. 5 illustrates the operation of the media brokers 24, 32, 40, and 48 of FIG. 1 to generate the distributed aggregate guide 64 for the user sites 12 through 18 according to one embodiment of the present disclosure. In this embodiment, the media brokers 24, 32, 40, and 48 establish a distributed playback group (step 3000). The distributed playback group may be established using any suitable technique. For example, in one embodiment, a user at the user site 12 sends, via one of the renderers 22, a DAG request to the media broker 24. In response, the DAG client 62 is launched. Similarly, the DAG clients of the media brokers 32, 40, and 48 at the user sites 14, 16, and 18 are also launched. The users then agree to participate in a collaborative playback session with one another, thereby forming the distributed playback group. Note that, for example, the user at the user site 12 may invite the users at the user sites 14, 16, and 18 to participate in a distributed playback group. Alternatively, the users at the user sites 12 through 18 may have previously agreed to participate in the distributed playback group at this particular time via an alternative communication mechanism (e.g., email, verbal conversation, or the like). Further, in one embodiment, the users in the distributed playback group optionally select what type of media content that they would like to play for the collaborative playback session (e.g., live or recorded, movie or television program, or the like) in a collaborative manner.

The media broker 24, and more specifically the DAG client 62 of the media broker 24, filters the local aggregate guide 58 for the user site 12 to provide a filtered version of the local aggregate guide 58 to share with the other media brokers 32, 40, and 48 (step 3002). Note that step 3002 is optional. In one embodiment, the local aggregate guide 58 may be filtered to remove entries for any media items for which inclusion in the local aggregate guide 58 or the resulting distributed aggregate guide 64 would violate Digital Rights Management (DRM), copyright, or other legal restrictions placed on the media items. In addition or alternatively, the local aggregate guide 58 may be filtered based on one or more filtering criteria included in the user preferences of the user(s) of the user site 12. The filtering criteria may include any type of criteria that defines a subset of the local aggregate guide 58 to be included in or excluded from the filtered version of the local aggregate guide 58. For example, the filtering criteria may be such that entries for home movies are not included in the filtered version of the local aggregate guide 58. As another example, the filtering criteria may be such that entries for video content that may potentially be objectionable to other users (e.g., R rated movies) are not included in the filtered version of the local aggregate guide 58. The media broker 24 then sends the filtered version of the local aggregate guide 58 to the other media brokers 32, 40, and 48 at the user sites 14, 16, and 18 of the other users in the distributed playback group that are to participate in the collaborative playback session via the network 52 (step 3004).

In a similar manner, the media broker 32 filters the local aggregate guide of the user site 14 and sends the filtered version of the local aggregate guide of the user site 14 to the other media brokers 24, 40, and 48 (steps 3006 and 3008). Likewise, the media broker 40 filters the local aggregate guide of the user site 16 and sends the filtered version of the local aggregate guide of the user site 16 to the other media brokers 24, 32, and 48 (steps 3010 and 3012). The media broker 48 filters the local aggregate guide of the user site 18 and sends the filtered version of the local aggregate guide of the user site 18 to the other media brokers 24, 32, and 40 (steps 3014 and 3016). Like with the local aggregate guide 58 of the user site 12, filtering of the local aggregate guides of the user sites 14, 16, and 18 by the media brokers 32, 40, and 48, respectively, is optional.

The media broker 24, and more specifically the DAG client 62 of the media broker 24, then aggregates the filtered versions of the local aggregate guides of the other user sites 14, 16, and 18 received from the other media brokers 32, 40, and 48 with the filtered version of the local aggregate guide 58 of the user site 12 to form the distributed aggregate guide 64 (step 3018). In this embodiment, the DAG client 62 filters the distributed aggregate guide 64 (step 3020). More specifically, the DAG client 62 may filter the distributed aggregate guide 64 to remove content that is not accessible at all of the user sites 12 through 18. For example, if a particular video item or group of video items included in the distributed aggregate guide 64 are not accessible to any of the media controllers 28 at the user site 14, then the entry for that particular video item or group of video items may be removed from the distributed aggregate guide 64 or, alternatively, flagged within the distributed aggregate guide 64.

The DAG client 62 displays the distributed aggregate guide 64 to the user(s) at the user site 12 at one or more of the renderers 22 (step 3022). Preferably, the distributed aggregate guide 64 is displayed in a manner that is personalized for the user(s) at the user site 12. For example, the DAG client 62 may personalize the distributed aggregate guide 64 by prioritizing the media items in the distributed aggregate guide 64 in the display based on the user preferences of the user(s) of the user site 12. In addition or alternatively, the DAG client 62 of the media broker 24 may personalize the distributed aggregate guide 64 for the user site 12 by including indicators of characteristics of the media items in the distributed aggregate guide 64 for the user site 12 such as, for example, quality of the versions of the media items accessible at the user site 12, whether the media items are accessible at the user site 12, or the like. In addition, if the distributed aggregate guide 64 includes media items that are not accessible at the user site 12, the distributed aggregate guide 64 may be personalized by providing indicators for any media items that are not currently accessible at the user site 12 but for which one or more of the media controllers 20 at the user site 12 may acquire access from another source (e.g., an online movie rental service).

As discussed below in detail, the distributed aggregate guide 64 is displayed to the user(s) at the user site 12 via a Graphical User Interface (GUI) (e.g., an interactive menu) where the user(s) is enabled to browse the distributed aggregate guide 64 and select one or more media items to suggest for the collaborative playback session. In addition, the user(s) may be enabled to select one or more media items to block from the collaborative playback session (i.e., select one or more media items that are to be prevented from being selected as the media item for the collaborative playback session). Still further, the user(s) may be enabled to preview media items in the distributed aggregate guide 64 if such previews are available.

In a similar manner, the media broker 32 aggregates the filtered versions of the local aggregate guides of the other user sites 12, 16, and 18 received from the other media brokers 24, 40, and 48 with the filtered version of the local aggregate guide of the user site 14 to form the distributed aggregate guide 64 for the user site 14 (step 3024). Notably, the same distributed aggregate guide 64 is formed at each of the user sites 12 through 18. However, the distributed aggregate guide 64 is preferably personalized when displayed to users at the user sites 12 through 18. In this embodiment, the media broker 32 filters the distributed aggregate guide 64 (step 3026). More specifically, the media broker 32 may filter the distributed aggregate guide 64 to remove content that is not accessible at all of the user sites 12 through 18.

The media broker 32 displays the distributed aggregate guide 64 to the user(s) at the user site 14 at one or more of the renderers 30 (step 3028). Preferably, the distributed aggregate guide 64 is displayed in a manner that is personalized for the user(s) at the user site 14. For example, the media broker 32 may personalize the distributed aggregate guide 64 by prioritizing the media items in the distributed aggregate guide 64 in the display based on the user preferences of the user(s) of the user site 14. In addition or alternatively, the media broker 32 may personalize the distributed aggregate guide 64 for the user site 14 by including indicators of characteristics of the media items in the distributed aggregate guide 64 for the user site 14 such as, for example, quality of the versions of the media items accessible at the user site 14, whether the media items are accessible at the user site 14, or the like. In addition, if the distributed aggregate guide 64 includes media items that are not accessible at the user site 14, the distributed aggregate guide 64 may be personalized by providing indicators for any media items that are not currently accessible at the user site 14 but for which one or more of the media controllers 28 at the user site 14 may acquire access from another source (e.g., an online movie rental service).

As discussed below in detail, the distributed aggregate guide 64 is displayed to the user(s) at the user site 14 via a GUI (e.g., an interactive menu) where the user(s) is enabled to browse the distributed aggregate guide 64 and select one or more media items to suggest for the collaborative playback session. In addition, the user(s) may be enabled to select one or more media items to block from the collaborative playback session (i.e., select one or more media items that are to be prevented from being selected as the media item for the collaborative playback session). Still further, the user(s) may be enabled to preview media items in the distributed aggregate guide 64 if such previews are available.

Likewise, the media broker 40 aggregates the filtered versions of the local aggregate guides of the other user sites 12, 14, and 18 received from the other media brokers 24, 32, and 48 with the filtered version of the local aggregate guide of the user site 16 to form the distributed aggregate guide 64 for the user site 16 (step 3030). In this embodiment, the media broker 40 filters the distributed aggregate guide 64 (step 3032). More specifically, the media broker 40 may filter the distributed aggregate guide 64 to remove content that is not accessible at all of the user sites 12 through 18.

The media broker 40 displays the distributed aggregate guide 64 to the user(s) at the user site 16 at one or more of the renderers 38 (step 3034). Preferably, the distributed aggregate guide 64 is displayed in a manner that is personalized for the user(s) at the user site 16. For example, the media broker 40 may personalize the distributed aggregate guide 64 by prioritizing the media items in the distributed aggregate guide 64 in the display based on the user preferences of the user(s) of the user site 16. In addition or alternatively, the media broker 40 may personalize the distributed aggregate guide 64 for the user site 16 by including indicators of characteristics of the media items in the distributed aggregate guide 64 for the user site 16 such as, for example, quality of the versions of the media items accessible at the user site 16, whether the media items are accessible at the user site 16, or the like. In addition, if the distributed aggregate guide 64 includes media items that are not accessible at the user site 16, the distributed aggregate guide 64 may be personalized by providing indicators for any media items that are not currently accessible at the user site 16 but for which one or more of the media controllers 36 at the user site 16 may acquire access from another source (e.g., an online movie rental service).

As discussed below in detail, the distributed aggregate guide 64 is displayed to the user(s) at the user site 16 via a GUI (e.g., an interactive menu) where the user(s) is enabled to browse the distributed aggregate guide 64 and select one or more media items to suggest for the collaborative playback session. In addition, the user(s) may be enabled to select one or more media items to block from the collaborative playback session (i.e., select one or more media items that are to be prevented from being selected as the media item for the collaborative playback session). Still further, the user(s) may be enabled to preview media items in the distributed aggregate guide 64 if such previews are available.

Likewise, the media broker 48 aggregates the filtered versions of the local aggregate guides of the other user sites 12, 14, and 16 received from the other media brokers 24, 32, and 40 with the filtered version of the local aggregate guide of the user site 18 to form the distributed aggregate guide 64 for the user site 18 (step 3036). In this embodiment, the media broker 48 filters the distributed aggregate guide 64 (step 3038). More specifically, the media broker 48 may filter the distributed aggregate guide 64 to remove content that is not accessible at all of the user sites 12 through 18.

The media broker 48 displays the distributed aggregate guide 64 to the user(s) at the user site 18 at one or more of the renderers 46 (step 3040). Preferably, the distributed aggregate guide 64 is displayed in a manner that is personalized for the user(s) at the user site 18. For example, the media broker 48 may personalize the distributed aggregate guide 64 by prioritizing the media items in the distributed aggregate guide 64 in the display based on the user preferences of the user(s) of the user site 18. In addition or alternatively, the media broker 48 may personalize the distributed aggregate guide 64 for the user site 18 by including indicators of characteristics of the media items in the distributed aggregate guide 64 for the user site 18 such as, for example, quality of the versions of the media items accessible at the user site 18, whether the media items are accessible at the user site 18, or the like. In addition, if the distributed aggregate guide 64 includes media items that are not accessible at the user site 18, the distributed aggregate guide 64 may be personalized by providing indicators for any media items that are not current accessible at the user site 18 but for which one or more of the media controllers 44 at the user site 18 may acquire access from another source (e.g., an online movie rental service).

As discussed below in detail, the distributed aggregate guide 64 is displayed to the user(s) at the user site 18 via a GUI (e.g., an interactive menu) where the user(s) is enabled to browse the distributed aggregate guide 64 and select one or more media items to suggest for the collaborative playback session. In addition, the user(s) may be enabled to select one or more media items to block from the collaborative playback session (i.e., select one or more media items that are to be prevented from being selected as the media item for the collaborative playback session). Still further, the user(s) may be enabled to preview media items in the distributed aggregate guide 64 if such previews are available.

Figure 6:
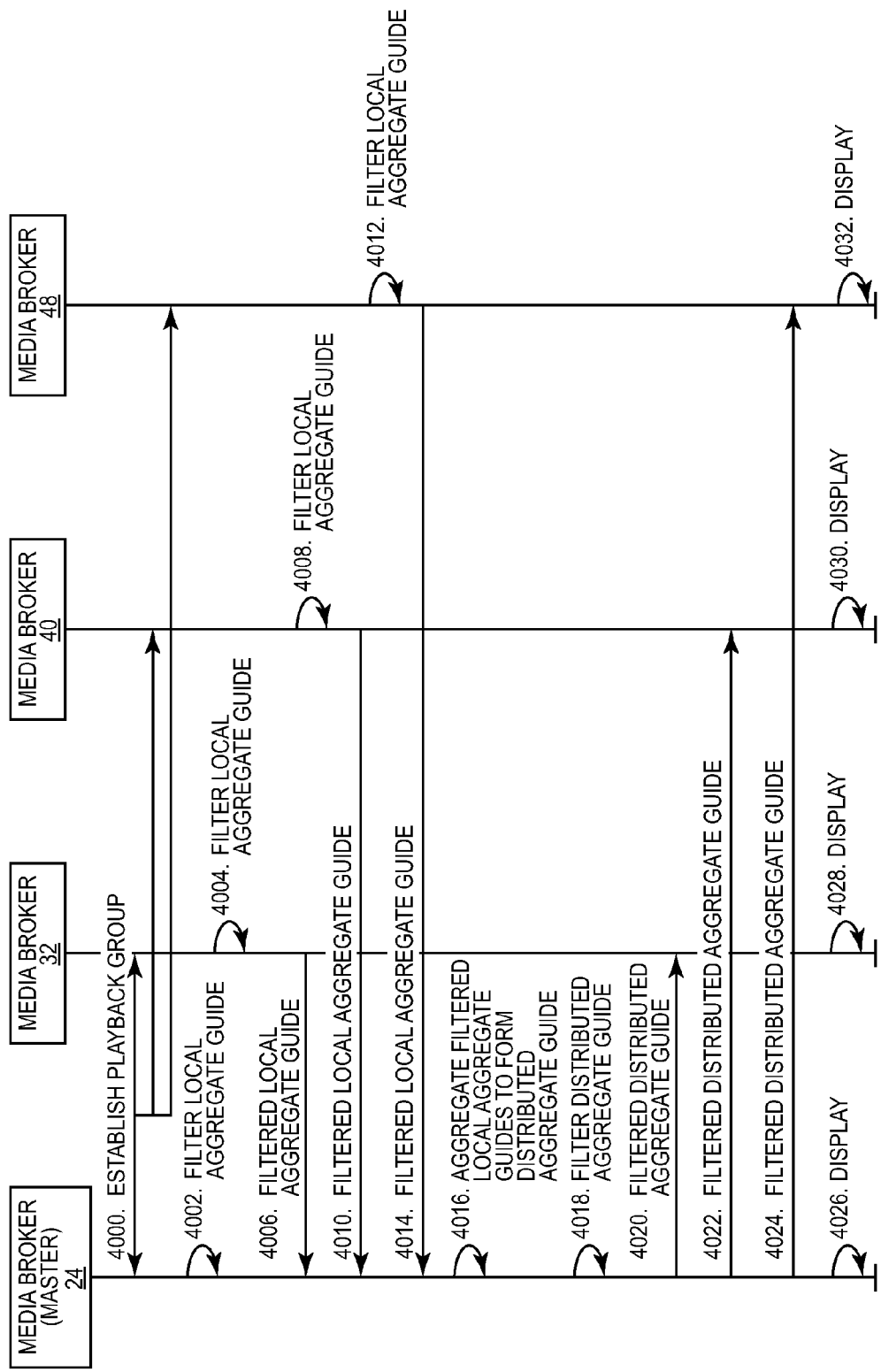
FIG. 6 illustrates the operation of the system of FIG. 1 to generate a distributed aggregate guide for a distributed group of users according to another embodiment of the present disclosure.

FIG. 6 illustrates the operation of the media brokers 24, 32, 40, and 48 of FIG. 1 to generate the distributed aggregate guide 64 according to another embodiment of the present disclosure. In this embodiment, the media broker 24 operates as master media broker that performs the aggregation of the local aggregate guides of the user sites 12 through 18 to form the distributed aggregate guide 64. First, as discussed above, the distributed playback group is established (step 4000). The media broker 24, and more specifically the DAG client 62 of the media broker 24, filters the local aggregate guide 58 for the user site 12 to provide a filtered version of the local aggregate guide 58 (step 4002). Note that step 4002 is optional. The local aggregate guide 58 may be filtered based on one or more filtering criteria included in the user preferences of the user(s) of the user site 12. The filtering criteria may include any type of criteria that defines a subset of the local aggregate guide to be included in or excluded from the filtered version of the local aggregate guide 58. For example, the filtering criteria may be such that entries for home movies are not included in the filtered version of the local aggregate guide 58. As another example, the filtering criteria may be such that entries for video content that may potentially be objectionable to other users (e.g., R rated movies) are not included in the filtered version of the local aggregate guide 58.

The media broker 32 filters the local aggregate guide of the user site 14 in a manner similar to that described above with respect to step 4002 and sends the filtered version of the local aggregate guide of the user site 14 to the media broker 24, which serves as the master media broker (steps 4004 and 4006). Likewise, the media broker 40 filters the local aggregate guide of the user site 16 and sends the filtered version of the local aggregate guide of the user site 16 to the media broker 24 (steps 4008 and 4010). The media broker 48 filters the local aggregate guide of the user site 18 and sends the filtered version of the local aggregate guide of the user site 18 to the media broker 24 (steps 4012 and 4014). Like with the local aggregate guide 58 of the user site 12, filtering of the local aggregate guides of the user sites 14, 16, and 18 by the media brokers 32, 40, and 48, respectively, is optional.

The media broker 24, and more specifically the DAG client 62 of the media broker 24, then aggregates the filtered versions of the local aggregate guides of the other user sites 14, 16, and 18 received from the other media brokers 32, 40, and 48 with the filtered version of the local aggregate guide 58 of the user site 12 to form the distributed aggregate guide 64 (step 4016). In this embodiment, the DAG client 62 filters the distributed aggregate guide 64 (step 4018). More specifically, the DAG client 62 may filter the distributed aggregate guide 64 to remove content that is not accessible at all of the user sites 12 through 18. For example, if a particular video item or group of video items included in the distributed aggregate guide 64 are not accessible to any of the media controllers 28 at the user site 14, then the entry for that particular video item or group of video items may be removed from the distributed aggregate guide 64 or, alternatively, flagged within the distributed aggregate guide 64. The media broker 24, and more specifically the DAG client 62, then sends the filtered version of the distributed aggregate guide 64 to the other media brokers 32, 40, and 48 via the network 52 (steps 4020 through 4024).

The DAG client 62 of the media broker 24 displays the distributed aggregate guide 64 to the user(s) at the user site 12 at one or more of the renderers 22 (step 4026). Preferably, the distributed aggregate guide 64 is displayed in a manner that is personalized for the user(s) at the user site 12. For example, the DAG client 62 may personalize the distributed aggregate guide 64 by prioritizing the media items in the distributed aggregate guide 64 in the display based on the user preferences of the user(s) of the user site 12. In addition or alternatively, the DAG client 62 of the media broker 24 may personalize the distributed aggregate guide 64 for the user site 12 by including indicators of characteristics of the media items in the distributed aggregate guide 64 for the user site 12 such as, for example, quality of the versions of the media items accessible at the user site 12, whether the media items are accessible at the user site 12, or the like. In addition, if the distributed aggregate guide 64 includes media items that are not accessible at the user site 12, the distributed aggregate guide 64 may be personalized by providing indicators for any media items that are not currently accessible at the user site 12 but for which one or more of the media controllers 20 at the user site 12 may acquire access from another source (e.g., an online movie rental service).

As discussed below in detail, the distributed aggregate guide 64 is displayed to the user(s) at the user site 12 via a GUI (e.g., an interactive menu) where the user(s) is enabled to browse the distributed aggregate guide 64 and select one or more media items to suggest for the collaborative playback session. In addition, the user(s) may be enabled to select one or more media items to block from the collaborative playback session (i.e., select one or more media items that are to be prevented from being selected as the media item for the collaborative playback session). Still further, the user(s) may be enabled to preview media items in the distributed aggregate guide 64 if such previews are available.

Likewise, the media broker 32 displays the filtered version of the distributed aggregate guide 64 to the user(s) at the user site 14 via one or more of the renderers 30 (step 4028). Preferably, the distributed aggregate guide 64 is displayed in a manner that is personalized for the user(s) at the user site 14. For example, the media broker 32 may personalize the distributed aggregate guide 64 by prioritizing the media items in the distributed aggregate guide 64 in the display based on the user preferences of the user(s) of the user site 14. In addition or alternatively, the media broker 32 may personalize the distributed aggregate guide 64 for the user site 14 by including indicators of characteristics of the media items in the distributed aggregate guide 64 for the user site 14 such as, for example, quality of versions of the media items accessible at the user site 14, whether the media items are accessible at the user site 14, or the like. In addition, if the distributed aggregate guide 64 includes media items that are not accessible at the user site 14, the distributed aggregate guide 64 may be personalized by providing indicators for any media items that are not currently accessible at the user site 14 but for which one or more of the media controllers 28 at the user site 14 may acquire access from another source (e.g., an online movie rental service).

As discussed below in detail, the distributed aggregate guide 64 is displayed to the user(s) at the user site 14 via a GUI (e.g., an interactive menu) where the user(s) is enabled to browse the distributed aggregate guide 64 and select one or more media items to suggest for the collaborative playback session. In addition, the user(s) may be enabled to select one or more media items to block from the collaborative playback session (i.e., select one or more media items that are to be prevented from being selected as the media item for the collaborative playback session). Still further, the user(s) may be enabled to preview media items in the distributed aggregate guide 64 if such previews are available.

Likewise, the media broker 40 displays the filtered version of the distributed aggregate guide 64 to the user(s) at the user site 16 via one or more of the renderers 38 (step 4030). Preferably, the distributed aggregate guide 64 is displayed in a manner that is personalized for the user(s) at the user site 16. For example, the media broker 40 may personalize the distributed aggregate guide 64 by prioritizing the media items in the distributed aggregate guide 64 in the display based on the user preferences of the user(s) of the user site 16. In addition or alternatively, the media broker 40 may personalize the distributed aggregate guide 64 for the user site 16 by including indicators of characteristics of the media items in the distributed aggregate guide 64 for the user site 16 such as, for example, quality of versions of the media items accessible at the user site 16, whether the media items are accessible at the user site 16, or the like. In addition, if the distributed aggregate guide 64 includes media items that are not accessible at the user site 16, the distributed aggregate guide 64 may be personalized by providing indicators for any media items that are not currently accessible at the user site 16 but for which one or more of the media controllers 36 at the user site 16 may acquire access from another source (e.g., an online movie rental service).

As discussed below in detail, the distributed aggregate guide 64 is displayed to the user(s) at the user site 16 via a GUI (e.g., an interactive menu) where the user(s) is enabled to browse the distributed aggregate guide 64 and select one or more media items to suggest for the collaborative playback session. In addition, the user(s) may be enabled to select one or more media items to block from the collaborative playback session (i.e., select one or more media items that are to be prevented from being selected as the media item for the collaborative playback session). Still further, the user(s) may be enabled to preview media items in the distributed aggregate guide 64 if such previews are available.

Likewise, the media broker 48 displays the filtered version of the distributed aggregate guide 64 to the user(s) at the user site 18 via one or more of the renderers 46 (step 4032). Preferably, the distributed aggregate guide 64 is displayed in a manner that is personalized for the user(s) at the user site 18. For example, the media broker 48 may personalize the distributed aggregate guide 64 by prioritizing the media items in the distributed aggregate guide 64 in the display based on the user preferences of the user(s) of the user site 18. In addition or alternatively, the media broker 48 may personalize the distributed aggregate guide 64 for the user site 18 by including indicators of characteristics of the media items in the distributed aggregate guide 64 for the user site 18 such as, for example, quality of versions of the media items accessible at the user site 18, whether the media items are accessible at the user site 18, or the like. In addition, if the distributed aggregate guide 64 includes media items that are not accessible at the user site 18, the distributed aggregate guide 64 may be personalized by providing indicators for any media items that are not currently accessible at the user site 18 but for which one or more of the media controllers 44 at the user site 18 may acquire access from another source (e.g., an online movie rental service).

As discussed below in detail, the distributed aggregate guide 64 is displayed to the user(s) at the user site 18 via a GUI (e.g., an interactive menu) where the user(s) is enabled to browse the distributed aggregate guide 64 and select one or more media items to suggest for the collaborative playback session. In addition, the user(s) may be enabled to select one or more media items to block from the collaborative playback session (i.e., select one or more items that are to be prevented from being selected as the media item for the collaborative playback session). Still further, the user(s) may be enabled to preview media items in the distributed aggregate guide 64 if such previews are available.

Figure 7:
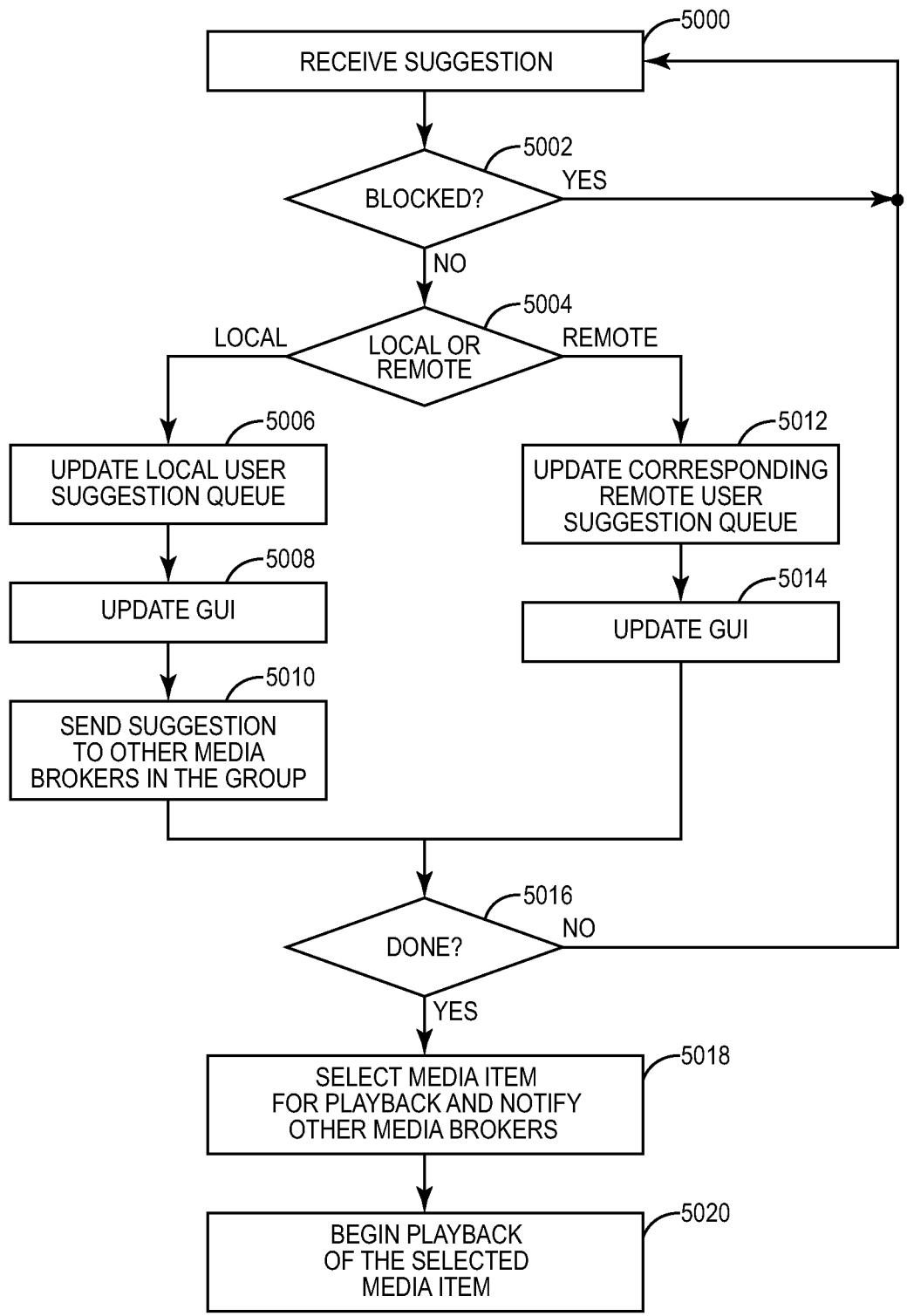
FIG. 7 is a flow chart for a process in which the distributed aggregate guide is utilized to suggest media items for a collaborative playback session and a media item is selected for the collaborative playback session based on the suggested media items according to one embodiment of the present disclosure.

FIG. 7 is a flow chart illustrating the operation of the DAG client 62 of the media broker 24 to receive media item suggestions from the users in the distributed group of users for the collaborative playback session and process the media item suggestions to select a media item for the collaborative playback session according to one embodiment of the present disclosure. In general, once the distributed aggregate guide 64 is displayed to the users at the user sites 12 through 18 by the media brokers 24, 32, 40, and 48 as described above with respect to FIGS. 5 and 6, the users are enabled to select media items from the distributed aggregate guide 64 to suggest for the collaborative playback session. First, the DAG client 62 receives a media item suggestion that identifies a media item selected from the distributed aggregate guide 64 by one of the users at one of the user sites 12 through 18 (step 5000). The media item suggestion may be received from a user at the user site 12 (i.e., a local user). The media suggestion may alternatively be received from a user at one of the other user sites 14 through 18 (i.e., a remote user). For example, a user at the user site 12 (i.e., a local user) may select a media item from the distributed aggregate guide 64 via a user interface of one of the renderers 22 at the user site 12. As another example, a user at the user site 14 (i.e., a remote user) may select a media item from the distributed aggregate guide 64 via a user interface of one of the renderers 30 at the user site 14. The media broker 32 of the user site 14 receives the media item suggestion from the user at the user site 14 and, as part of the processing of the suggestion at the media broker 32, sends the media item suggestion to the media broker 24 of the user site 12.

The DAG client 62 of the media broker 24 then determines whether the media item suggestion is for a media item that has been blocked (step 5002). As noted above, the users in the distributed group may be enabled to select media items from the distributed aggregate guide 64 to block. When a user blocks a media item, the distributed aggregate guide 64 may be updated to reflect that the media item has been blocked. As one exemplary alternative, the blocked media item may be removed from the distributed aggregate guide 64. If the media item suggestion is for a media item that has been blocked, the process returns to step 5000 and is repeated for the next received media item suggestion.

If the media item suggestion is not for a blocked media item, the DAG client 62 of the media broker 24 determines whether the media item suggestion is received from a local user (i.e., a user at the user site 12) or a remote user (i.e., a user at one of the other user sites 14 through 18) (step 5004). If the media item suggestion is from a local user, the DAG client 62 updates the suggestion queue 68 of the local user to include the media item suggestion (step 5006). Note that the media item suggestion may also include a ranking, or priority, of the media item suggestion within the suggestion queue 68 of the local user, where the ranking is defined by the local user. The DAG client 62 also updates the GUI, or display, presented to the user(s) at the user site 12 to reflect the media item suggestion from the local user (step 5008). For example, in one embodiment, the GUI, or display, presented to the user(s) at the user site 12 includes both the distributed aggregate guide 64 and the suggestion queues 68 of the users in the distributed group for the collaborative playback session. In this case, the suggestion queue 68 of the local user presented in the GUI, or display, is updated to include the media item suggestion received in step 5000. The DAG client 62 also sends the media item suggestion received from the local user to the other media brokers 32, 40, and 48 (step 5010).

Returning to step 5004, if the media item suggestion is from a remote user, the DAG client 62 updates the suggestion queue 68 of the corresponding remote user (step 5012). The DAG client 62 also updates the GUI, or display, presented to the user(s) at the user site 12 to reflect the media item suggestion from the remote user (step 5014). For example, in one embodiment, the GUI, or display, presented to the user(s) at the user site 12 includes both the distributed aggregate guide 64 and the suggestion queues 68 of the users in the distributed group for the collaborative playback session. In this case, the suggestion queue 68 of the remote user presented in the GUI, or display, is also updated to include the media item suggestion received in step 5000.

At this point, it should be noted that an auto-record feature may be provided. More specifically, if a media item suggestion is received for a media item that is currently being broadcast live or will soon begin broadcasting live, the DAG client 62 may initiate recording of the media item at the user sites 12 through 18. In this manner, if the media item is subsequently selected for the distributed playback session, playback can begin at the start of the media item (or at least nearer to the start of the media item).

Next, whether proceeding from step 5010 or 5014, the DAG client 62 determines whether it is done with reception of media item suggestions for the collaborative playback session (step 5016). Reception of media item suggestions is preferably complete when either (1) all of the users in the distributed group for the collaborative playback session have indicated that they are finished making suggestions or (2) the top ranked media item suggestion for all of the users in the distributed group for the collaborative playback session is the same. If reception of media item suggestions is not complete, the process returns to step 5000 and is repeated for the next received media item suggestion.

Once reception of media item suggestions is complete, the DAG client 62 selects a media item for the collaborative playback session based on the media item suggestions received from the users in the distributed group for the collaborative playback session and notifies the other media brokers 32, 40, and 48 of the selected media item (step 5018). More specifically, in one embodiment, the DAG client 62 determines whether all of the users in the distributed group have ranked the same media item suggestion as their top media item suggestion in their suggestion queues 68. If so, the media item identified by that media item suggestion is selected as the media item for the collaborative playback session. Otherwise, the DAG client 62 selects the media item for the collaborative playback session from the media item suggestions in the suggestion queues 68 of the users in the distributed group based on a predetermined algorithm. For example, the DAG client 62 may select the media item for the collaborative playback session from the media item suggestions in the suggestion queues 68 of the users in the distributed group based on one or more of the following criteria:

the rankings of the media items in the suggestion queues 68 of the users in the distributed group,
user ratings for the media items if available,
degree of similarity between the media items in the suggestion queues 68 of the users in the distributed group and the user preferences of the users in the distributed group,
qualities of the versions of the media items in the suggestion queues 68 of the users in the distributed group that are accessible at the user sites 12 through 18,
the number of user sites or percentage of user sites that have access to the media items in the suggestion queues 68 of the distributed group,
weighting of locked-in content,
weighting of live content versus stored content,
weighting of content already viewed versus content not yet viewed, and
play histories of the users in the distributed group.

For example, the DAG client 62 may score the media items identified by the media item suggestions based on one or more of the factors listed above. The media item having the highest score may then be selected as the media item for the collaborative playback session.

Lastly, the DAG client 62 begins playback of the selected media item at one or more of the renderers 22 at the user site 12 (step 5020). Note, however, that in one embodiment the DAG client 62 may notify the user(s) at the user site 12 of the selected media item and begin playback upon acceptance by the user(s). More specifically, in one embodiment, the distributed aggregate guide 64 includes only media items that are accessible at all of the user sites 12 through 18. In this case, the DAG client 62 determines which media controller 20 at the user site 12 has access to the selected media item and then instructs one or more of the renderers 22 to begin playback of the selected media item from the media controller 20 having access to the media item. Also, as a result of the notifications sent to the other media brokers 32, 40, and 48 in step 5018, the other media brokers 32, 40, and 48 effect, or cause, playback of the selected media item at the other user sites 14 through 18 in a similar manner. As a result, the collaborative playback session is provided wherein the users in the distributed group are consuming (e.g., viewing) the same media item at the same time. During the collaborative playback session, the users in the distributed group may interact via, for example, a chat feature provided by the system 10.

It should be noted that while the discussion herein focuses on the embodiment where the media controllers 20, 28, 36, and 44 have access to media content stored locally or from remote sources (e.g., television network or Internet source), the system 10 may additionally or alternatively enable site-to-site streaming of media content. For example, if a media item is selected for a collaborative playback session and the media controller 20 at the user site 12 has access to the media item but the media controllers 28, 36, and 44 at the other user sites 14 through 18 do not have access to the media item, the media controller 20 may stream the media item, or otherwise deliver the media item, to the renderers 30, 38, and 46 at the user sites 14 through 18 for playback for the collaborative playback session. This site-to-site streaming may be direct or through the media brokers 24, 32, 40, and 48. As another alternative, the media controller 20 may stream or otherwise deliver the media item to the media controllers 28, 36, and 44, which may then stream the media item to the renderers 30, 38, and 46 at the user sites 14 through 18. Note that the need for streaming may affect whether those media items are selected for the distributed playback session. For example, if the bandwidth required to stream a media item is greater than the available bandwidth, the media item may not be selected for playback in the distributed playback session. Media items that require streaming may be marked within the GUI presented by the DAG client 62. Also note that site-to-site streaming may be provided via a multicast stream or separate unicast streams.

It should also be noted that each of the media brokers 24, 32, 40, and 48 perform the process of FIG. 7. However, with regard to the selection of the media item for the collaborative playback session in step 5018, only one of the media brokers 24, 32, 40, and 48 performs the selection process. Specifically, in this embodiment, the media broker 24 performs the selection process and notifies the other media brokers 32, 40, and 48 of the selected media item. However, note that the other media brokers 32, 40, and 48 may provide data to the media broker 24 to be used in the selection process. For example, if the media items identified by the media item suggestions in the suggestion queues 68 of the users in the distributed group are scored based on the user preferences of the users, then each of the media brokers 24, 32, 40, and 48 may score the media items identified by the media item suggestions based on the user preferences of the users at the corresponding user sites 12 through 18. These scores may then be aggregated (e.g., averaged) by the media broker 24 to provide the final scores for the media items used to select the media item for the collaborative playback session.

Figure 8:
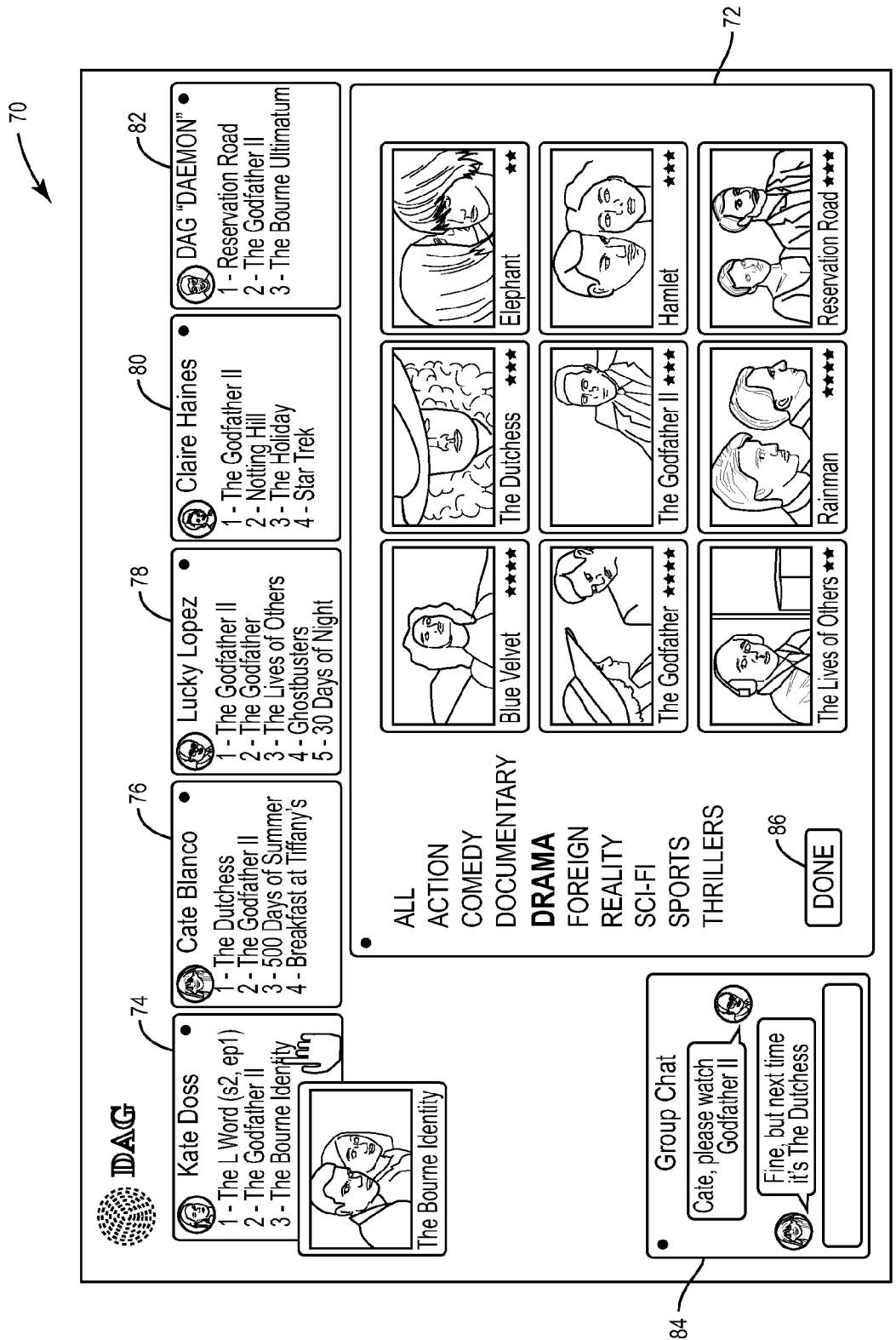
FIG. 8 illustrates an exemplary Graphical User Interface (GUI) for presenting a distributed aggregate guide to a user that enables the user to select media items from the distributed aggregate guide to suggest for a collaborative playback session according to one embodiment of the present disclosure.

FIG. 8 illustrates an exemplary GUI 70 for displaying the distributed aggregate guide 64 to the users at each of the user sites 12 through 18 according to one embodiment of the present disclosure. As illustrated, the GUI 70 includes a DAG display area 72 in which the distributed aggregate guide 64 is displayed to the user. Using the DAG display area 72, the user can browse the distributed aggregate guide 64 and select media items to add to the user's suggestion queue 68. Note that in this example, the distributed aggregate guide 64 is arranged by genre and media items are represented by corresponding thumbnails. The genres and the thumbnails of the media items may be included in the distributed aggregate guide 64 and may be obtained from any suitable source. In one exemplary embodiment, upon selecting a media item in the DAG display area 72, the user is given the option to add the media item to his suggestion queue 68, block the media item, or preview the media item if a preview is available. Note that the ordering or arrangement of the media items in the DAG display area 72 may be personalized for the user to which, or user site at which, the GUI 70 is displayed. Further, the DAG display area 72 may include indicators of availability of the media items (e.g., indicators as to whether the media item is available at the particular user site at which the GUI 70 is being presented and/or available to all of the user sites 12 through 18), indicators of the degree of match between each media item and the user preferences of the user to which the GUI 70 is displayed, indicators of the degree of match between each media item and the user preferences of the users of the user site at which the GUI 70 is being displayed, indicators of the degree of match between each media item and the user preferences of the users in the distributed group, indicators of which media items if any have been recently viewed (i.e., viewed within a predefined amount of time prior to the current time) by one or more users in the distributed group, indicators of which media items if any are in pre-existing content queues (e.g., Netflix watch queues) of the users in the distributed group, or indicators of which media items have been blocked or are likely to be rejected by one or more users in the distributed group. As another example, in some embodiments, the distributed aggregate guide 64 includes media items that may not currently be accessible at all of the user sites 12 through 18. As such, the DAG display area 72 may include indicators of which media items are not currently available at the user site but for which access rights may be obtained. The various indicators may be colors, symbols, or the like.

The GUI 70 also includes suggestion queue display areas 74, 76, 78, and 80 for the users in the distributed group. Note that while a single suggestion queue is illustrated for each user site 12 through 18 in this example, the present disclosure is not limited thereto. Each user site 12 through 18 may have one or more users each with his or her own suggestion queue. The suggestion queue display area 74 displays the suggestion queue 68 for the user "Kate Doss," the suggestion queue display area 76 displays the suggestion queue 68 for the user "Cate Blanco," the suggestion queue display area 78 displays the suggestion queue 68 for the user "Lucky Lopez," and the suggestion queue display area 80 displays the suggestion queue 68 for the user "Claire Haines." A user may select a media item in the suggestion queue 68 of another user to add the media item to his suggestion queue 68, block the media item, preview the media item, or comment on the media item suggestion. Adding a comment would cause the comment to be sent to the other user via, for example, a chat feature provided by the DAG clients of the media brokers 24, 32, 40, and 48 or some third-party chat or messaging service (e.g., Instant Messaging or text-messaging service). A user may select a media item in his suggestion queue 68 to adjust the ranking of the media item in his suggestion queue 68 or remove the media item from his suggestion queue 68.

In this embodiment, the GUI 70 also includes a DAG "Daemon" suggestion queue display area 82. The DAG "Daemon" suggestion queue display area 82 includes a number of media item suggestions generated by the DAG client 62 for the users in the distributed group. The media item suggestions may be generated based on the media item suggestions made by the users in the distributed group, viewing or play histories of the users in the distributed group, the user preferences of the users in the distributed group, or other interactions between the users in the distributed group with one another or the corresponding DAG clients. The suggestions in the DAG "Daemon" suggestion queue display area 82 are updated as the users make new media suggestions, block media items, or the like. The users can select the media items in the DAG "Daemon" suggestion queue display area 82 to add the media items to their own suggestion queues 68, block the media items, or preview the media items.

Lastly, the GUI 70 includes a group chat area 84 in which the DAG client 62 enables a group chat session between the users in the distributed group. Using the group chat session, the users in the group are enabled to chat about their media item suggestions, urge others to agree to their suggestions, or the like.

Once the user is finished making suggestions, the user selects a "done" button 86 to lock-in his media item suggestions. In one embodiment, once all of the users in the distributed group have locked-in their media item suggestions, the DAG client 62 selects a media item for the collaborative playback session for the distributed group based on the media item suggestions of the users.

Figure 9:
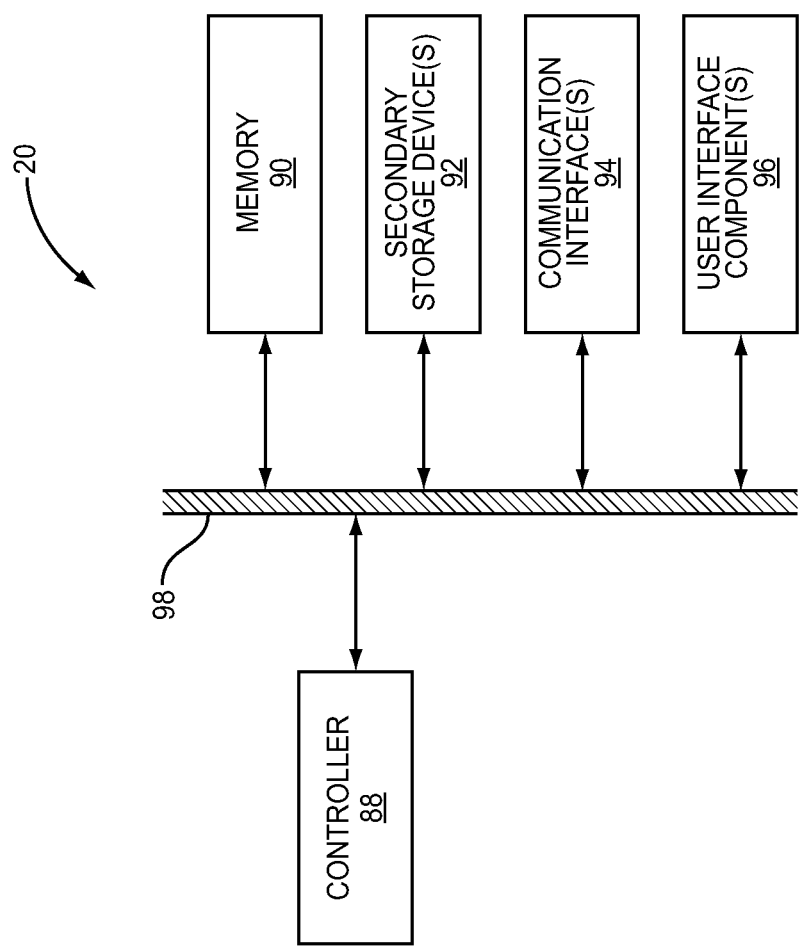
FIG. 9 is a block diagram of one of the media controllers of FIG. 1 according to one embodiment of the present disclosure.

FIG. 9 is a block diagram of one of the media controllers 20 at the first user site 12 according to one embodiment of the present disclosure. This discussion is equally applicable to the media controllers 28, 36, and 44 at the user sites 14 through 18. As illustrated, in this embodiment, the media controller 20 includes a controller 88 connected to memory 90, one or more secondary storage devices 92, one or more communication interfaces 94, and one or more user interface components 96 by a bus 98 or similar mechanism. The controller 88 is a microprocessor, digital Application Specific Integrated Circuit (ASIC), Field Programmable Gate Array (FPGA), or the like. In this embodiment, the controller 88 is a microprocessor, and software is stored in the memory 90 for execution by the controller 88. The software instructs the controller 88 to perform the functions of the media controller 20 described above. The secondary storage devices 92 are digital data storage devices such as, for example, one or more hard disk drives. The one or more communication interfaces 94 include a network interface to the local network 26 (FIG. 1). This same network interface may be used to connect the media controller 20 to the Internet such that the media controller 20 is enabled to obtain media content from Internet sources. In addition, the one or more communication interfaces 94 may include, for example, a tuner for a terrestrial or satellite based television network that enables the media controller 20 to receive television content, an Infrared (IR) receiver for receiving input from an associated user via a remote controller, or the like. The user interface components 96 may include, for example, one or more buttons, a display, a keypad, or the like.

FIG. 10 is a block diagram of one of the renderers 22 at the user site 12 according to one embodiment of the present disclosure. This discussion is equally applicable to the renderers 30, 38, and 46 at the user sites 14 through 18. As illustrated, in this embodiment, the renderer 22 includes a controller 100 connected to memory 102, one or more communication interfaces 104, a display 106, and one or more speakers 108 by a bus 110 or similar mechanism. The controller 100 is a microprocessor, digital ASIC, FPGA, or the like. In this embodiment, the controller 100 is a microprocessor, and software is stored in the memory 102 for execution by the controller 100. The software instructs the controller 100 to perform the functions of the renderer 22 described above. The one or more communication interfaces 104 include a network interface to the local network 26 (FIG. 1). In addition, the one or more communication interfaces 104 may include, for example, a Bluetooth® interface, a wired interface to one of the media controllers 20 (e.g., a High Definition Multimedia Interface (HDMI) interface), an IR receiver for receiving user input via a remote controller, or the like.

FIG. 11 is a block diagram of a device 112 hosting the media broker 24 according to one embodiment of the present disclosure. This discussion is equally applicable to the other media brokers 32, 40, and 48 at the user sites 14 through 18. As illustrated, the device 112 includes a controller 114 connected to memory 116, one or more secondary storage devices 118, one or more communication interfaces 120, and one or more user interface components 122 by a bus 124 or similar mechanism. The controller 114 is a microprocessor, digital ASIC, FPGA, or the like. In this embodiment, the controller 114 is a microprocessor, and the media broker 24 is implemented in software and stored in the memory 116 for execution by the controller 114. The secondary storage devices 118 are digital data storage devices such as, for example, one or more hard disk drives. The one or more communication interfaces 120 include a network interface to the local network 26 (FIG. 1). The user interface components 122 may include, for example, one or more buttons, a display, a keypad, or the like.

The systems and methods described herein have substantial opportunity for variation without departing from the scope of the present disclosure. For example, while the media items described herein are preferably video items, the present disclosure is not limited thereto. Other types of media items such as, for example, audio items may be used. Further, the systems and methods described herein may be used for a collaborative gaming session wherein a video game is selected for a gaming session for a group of distributed users. The video game may be an online game, a video game played on a gaming console, or the like. As another example, while the discussion above selects one media item for the collaborative playback session, any number of one or more media items may be selected for the collaborative playback session.

Those skilled in the art will recognize improvements and modifications to the preferred embodiments of the present disclosure. All such improvements and modifications are considered within the scope of the concepts disclosed herein and the claims that follow.

What is claimed is:

1. A method of enabling a collaborative playback session for a distributed group of users located at a plurality of distributed user sites consisting of a first user site and one or more second user sites, each user site of the plurality of distributed user sites comprising one or more media controllers having access to media content and one or more renderers that operate to render the media content accessible to the one or more media controllers at the user site, comprising:

generating a distributed aggregate guide that identifies a plurality of media items accessible to the media controllers at the plurality of distributed user sites, wherein generating the distributed aggregate guide comprises:

obtaining, by a distributed aggregate guide client of the first user site, information that identifies media items accessible to the one or more media controllers at the first user site;

obtaining, by the distributed aggregate guide client of the first user site, information that identifies media items accessible to the one or more media controllers at the one or more second user sites;

aggregating, by the distributed aggregate guide client of the first user site, the information that identifies the media items accessible to the one or more media controllers at the first user site and the information that identifies the media items accessible to the one or more media controllers at the one or more second user sites to generate the distributed aggregate guide that identifies the plurality of media items accessible to the media controllers at the plurality of distributed user sites; and causing display of the distributed aggregate guide in a personalized manner to a user at one of the one or more renderers at the first user site by displaying the distributed aggregate guide in a Graphical User Interface (GUI) including indicators of a degree of similarity between each of the plurality of media items and user preferences of the user at the one of the one or more renderers at the first user site;

receiving media item suggestions for the collaborative playback session selected from the distributed aggregate guide by at least a subset of the distributed group of users; and selecting a media item for the collaborative playback session based on the media item suggestions, wherein at least one of the preceding actions is performed on at least one electronic hardware component.

2. The method of claim 1 further comprising effecting playback of the media item selected for the collaborative playback session at the plurality of distributed user sites to thereby provide the collaborative playback session for the distributed group of users located at the plurality of distributed user sites.

3. The method of claim 1 wherein obtaining the information that identifies the media items accessible to the one or more media controllers at the first user site comprises:
obtaining a local aggregate guide that identifies media content accessible to the one or more media controllers at the first user site; and
filtering the local aggregate guide to provide the information that identifies the media items accessible to the one or more media controllers at the first user site.

4. The method of claim 1 further comprising filtering the distributed aggregate guide to remove entries for any media items that are not accessible to at least one media controller at each of the plurality of distributed user sites.

5. The method of claim 1 wherein causing display of the distributed aggregate guide in the personalized manner comprises displaying the distributed aggregate guide in a Graphical User Interface (GUI) including indicators of which media items of the plurality of media items in the distributed aggregate guide that are accessible to at least one media controller of the one or more media controllers at the first user site.

6. The method of claim 1 wherein causing display of the distributed aggregate guide in the personalized manner comprises displaying the distributed aggregate guide in a Graphical User Interface (GUI) including indicators of which media items of the plurality of media items in the distributed aggregate guide that are not accessible to at least one media controller of the one or more media controllers at the first user site.

7. The method of claim 1 wherein causing display of the distributed aggregate guide in the personalized manner comprises displaying the distributed aggregate guide in a Graphical User Interface (GUI) including indicators of which media items of the plurality of media items in the distributed aggregate guide that are not accessible to at least one media controller of the one or more media controllers at the first user site but for which access rights can be obtained by at least one of the one or more media controllers at the first user site.

8. The method of claim 1 wherein causing display of the distributed aggregate guide in the personalized manner comprises displaying the distributed aggregate guide in a Graphical User Interface (GUI) including indicators of one or more characteristics of the plurality of media items that are accessible to the one or more media controllers at the first user site.

9. The method of claim 8 wherein the one or more characteristics of the versions of the plurality of media items that are accessible to the one or more media controllers at the first user site comprise a quality of the versions of the plurality of media items that are accessible to the one or more media controllers at the first user site.

10. The method of claim 1 wherein causing display of the distributed aggregate guide in the personalized manner comprises displaying the distributed aggregate guide in a Graphical User Interface (GUI) in which the plurality of media items in the distributed aggregate guide are prioritized based on user preferences of the user at the one of the one or more renderers at the first user site.

11. The method of claim 1 wherein receiving the media item suggestions for the collaborative playback session comprises receiving one or more media item suggestions from the user at one of the one or more renderers at the first user site.

12. The method of claim 11 wherein receiving the media item suggestions for the collaborative playback session further comprises receiving one or more media item suggestions from one or more users at the one or more second user sites.

13. The method of claim 12 wherein selecting the media item for the collaborative playback session comprises selecting the media item for the collaborative playback session from a plurality of media items identified by the media item suggestions received from the user at the first user site and the one or more users at the one or more second user sites.

14. The method of claim 13 wherein the media item suggestions received from the user at the first user site are ranked by the user at the first user site and the media item suggestions received from the one or more users at the one or more second user sites are ranked by the corresponding ones of the one or more users at the one or more second user sites, and selecting the media item for the collaborative playback session from the plurality of media items identified by the media item suggestions received from the user at the first user site and the one or more users at the one or more second user sites comprises selecting the media item for the collaborative playback session from the plurality of media items identified by the media item suggestions based on the rankings of the media item suggestions.

15. The method of claim 13 wherein selecting the media item for the collaborative playback session from the plurality of media items identified by the media item suggestions received from the user at the first user site and the one or more users at the one or more second user sites comprises selecting the media item for the collaborative playback session from the plurality of media items identified by the media item suggestions based on user preferences of the user at the first user site and the one or more users at the one or more second user sites.

16. The method of claim 13 wherein selecting the media item for the collaborative playback session from the plurality of media items identified by the media item suggestions received from the user at the first user site and the one or more users at the one or more second user sites comprises selecting the media item for the collaborative playback session from the plurality of media items identified by the media item suggestions based on a quality of the media items accessible at the first user site and the one or more second user sites.

17. The method of claim 13 wherein selecting the media item for the collaborative playback session from the plurality of media items identified by the media item suggestions received from the user at the first user site and the one or more users at the one or more second user sites comprises selecting the media item for the collaborative playback session from the plurality of media items identified by the media item suggestions based on a number or percentage of the first user site and the one or more second user sites that have access to the plurality of media items identified by the media item suggestions.

18. The method of claim 13 wherein selecting the media item for the collaborative playback session from the plurality of media items identified by the media item suggestions received from the user at the first user site and the one or more users at the one or more second user sites comprises selecting the media item for the collaborative playback session from the plurality of media items identified by the media item suggestions based on whether the plurality of media items identified by the media item suggestions have already been consumed by any one or more of the user at the first user site and the one or more users at the one or more second user sites.

19. The method of claim 13 wherein selecting the media item for the collaborative playback session from the plurality of media items identified by the media item suggestions received from the user at the first user site and the one or more users at the one or more second user sites comprises selecting the media item for the collaborative playback session from the plurality of media items identified by the media item suggestions based on play histories of the user at the first user site and the one or more users at the one or more second user sites.

20. The method of claim 13 wherein the media item suggestions received from the user at the first user site are ranked by the user at the first user site and the media item suggestions received from the one or more users at the one or more second user sites are ranked by the corresponding ones of the one or more users at the one or more second user sites, and selecting the media item for the collaborative playback session from the plurality of media items identified by the media item suggestions received from the user at the first user site and the one or more users at the one or more second user sites comprises:
    determining whether a top ranked media item suggestion for the user at the first user site and a top ranked media item suggestion for the one or more users at the one or more second user sites are for a common media item; and
    selecting the common media item as the media item for the collaborative playback session.

21. The method of claim 1 further comprising effecting playback of the media item on at least one of the one or more renderers at each of the plurality of distributed user sites.

22. The method of claim 21 wherein effecting playback of the media item on the at least one of the one or more renderers at each of the plurality of distributed user sites comprises effecting playback of the media item on at least one of the one or more renderers at the first user site from one of the one or more media controllers at the first user site that has access to the media item.

23. The method of claim 22 wherein effecting playback of the media item on the at least one of the one or more renderers at each of the plurality of distributed user sites further comprises, for each second user site of the one or more second user sites, notifying a distributed aggregate guide client of the second user site of the media item selected for the collaborative playback session such that the distributed aggregate guide client of the second user site effects playback of the media item on at least one of the one or more renderers at the second user site.

24. The method of claim 1 wherein the plurality of media items accessible to the media controllers at the plurality of distributed user sites comprise a plurality of video items.

25. The method of claim 24 further comprising, in response to receiving the media item suggestions, causing a media controller of the one or more media controllers at the first user site to start recording at least one media item identified by the media item suggestions.

26. A method of claim 13 enabling a collaborative playback session for a distributed group of users located at a plurality of distributed user sites consisting of a first user site and one or more second user sites, each user site of the plurality of distributed user sites comprising one or more media controllers having access to media content and one or more renderers that operate to render the media content accessible to the one or more media controllers at the user site, comprising:
    generating a distributed aggregate guide that identifies a plurality of media items accessible to the media controllers at the plurality of distributed user sites, wherein generating the distributed aggregate guide comprises:
        obtaining, by a distributed aggregate guide client of the first user site, information that identifies media items accessible to the one or more media controllers at the first user site;
        obtaining, by the distributed aggregate guide client of the first user site, information that identifies media items accessible to the one or more media controllers at the one or more second user sites;
        aggregating, by the distributed aggregate guide client of the first user site, the information that identifies the media items accessible to the one or more media controllers at the first user site and the information that identifies the media items accessible to the one or more media controllers at the one or more second user sites to generate the distributed aggregate guide that identifies the plurality of media items accessible to the media controllers at the plurality of distributed user sites; and
    causing display of the distributed aggregate guide to a user at one of the one or more renderers at the first user site;
    receiving media item suggestions for the collaborative playback session selected from the distributed aggregate guide by at least a subset of the distributed group of users, wherein receiving the media item suggestions for the collaborative playback session comprises:
        receiving one or more media item suggestions from the user at one of the one or more renderers at the first user site; and
        receiving one or more media item suggestions from one or more users at the one or more second user sites; and
    selecting a media item for the collaborative playback session based on the media item suggestions, wherein selecting the media item for the collaborative playback wherein selecting the media item for the collaborative playback session from the plurality of media items identified by the media item suggestions received from the user at the first user site and the one or more users at the one or more second user sites comprises selecting the media item for the collaborative playback session from a plurality of media items identified by the media item suggestions based on preferences of the user at the first user site and the one or more users at the one or more second user sites regarding live versus stored media content,
    wherein at least one of the preceding actions is performed on at least one electronic hardware component.

27. A system at a first user site, comprising system component including:
    one or more media controllers at the first user site that have access to media content;
    one or more renderers associated with the one or more media controllers at the first user site that operate to render the media content accessible to the one or more media controllers; and
    a distributed aggregate guide client associated with the one or more media controllers and the one or more renderers at the first user site that operates to enable a collaborative playback session for a distributed group of users located at a plurality of distributed user sites consisting of the first user site and one or more second user sites, the distributed aggregate guide client being configured to:

generate a distributed aggregate guide that identifies a plurality of media items accessible to the one or more media controllers at the first user site and one or more media controllers at each of the one or more second user sites, wherein generating the distributed aggregate guide comprises:

obtaining, by a distributed aggregate guide client of the first user site, information that identifies media items accessible to the one or more media controllers at the first user site;

obtaining, by the distributed aggregate guide client of the first user site, information that identifies media items accessible to the one or more media controllers at the one or more second user sites;

aggregating, by the distributed aggregate guide client of the first user site, the information that identifies the media items accessible to the one or more media controllers at the first user site and the information that identifies the media items accessible to the one or more media controllers at the one or more second user sites to generate the distributed aggregate guide that identifies the plurality of media items accessible to the media controllers at the plurality of distributed user sites; and causing display of the distributed aggregate guide in a personalized manner to a user at one of the one or more renderers at the first user site by displaying the distributed aggregate guide in a Graphical User Interface (GUI) including indicators of a degree of similarity between each of the plurality of media items and user preferences of the user at the one of the one or more renderers at the first user site;

receive media item suggestions for the collaborative playback session selected from the distributed aggregate guide by at least a subset of the distributed group of users; and select a media item for the collaborative playback session based on the media item suggestions, wherein at least one of the system components includes at least one electronic hardware component.

28. The system of claim 27 wherein the distributed aggregate guide client is hosted by a separate device at the first user site.

29. The system of claim 27 wherein the distributed aggregate guide client is hosted by one of the one or more media controllers at the first user site.

30. A non-transitory computer-readable medium storing software for instructing a controller of a computing device to:

generate a distributed aggregate guide that identifies a plurality of media items accessible to media controllers at a plurality of distributed user sites consisting of a first user site and one or more second user sites, wherein to generate the distributed aggregate guide, the controller of the computing device is instructed to:

obtain, by a distributed aggregate guide client of the first user site, information that identifies media items accessible to the one or more media controllers at the first user site;

obtain, by the distributed aggregate guide client of the first user site, information that identifies media items accessible to the one or more media controllers at the one or more second user sites;

aggregate, by the distributed aggregate guide client of the first user site, the information that identifies the media items accessible to the one or more media controllers at the first user site and the information that identifies the media items accessible to the one or more media controllers at the one or more second user sites to generate the distributed aggregate guide that identifies the plurality of media items accessible to the media controllers at the plurality of distributed user sites; and cause display of the distributed aggregate guide in a personalized manner to a user at one of the one or more renderers at the first user site by displaying the distributed aggregate guide in a Graphical User Interface (GUI) including indicators of a degree of similarity between each of the plurality of media items and user preferences of the user at the one of the one or more renderers at the first user site;

receive media item suggestions for a collaborative playback session selected from the distributed aggregate guide by at least a subset of a distributed group of users located at the plurality of distributed user sites; and select a media item for the collaborative playback session based on the media item suggestions.

* * * * *